(12) United States Patent
Jeon et al.

(10) Patent No.: US 12,131,088 B2
(45) Date of Patent: Oct. 29, 2024

(54) ELECTRONIC DEVICE INCLUDING FLEXIBLE DISPLAY AND METHOD FOR CONTROLLING SAME

(71) Applicant: SAMSUNG ELECTRONICS CO., LTD., Suwon-si (KR)

(72) Inventors: Jiwon Jeon, Suwon-si (KR); Hongsik Park, Suwon-si (KR); Donghee Kang, Suwon-si (KR); Youngchan Woo, Suwon-si (KR); Joayoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/846,668

(22) Filed: Jun. 22, 2022

(65) Prior Publication Data

US 2023/0053032 A1 Feb. 16, 2023

Related U.S. Application Data

(63) Continuation of application No. PCT/KR2022/005678, filed on Apr. 20, 2022.

(30) Foreign Application Priority Data

Aug. 12, 2021 (KR) .................. 10-2021-0106643

(51) Int. Cl.
  *G06F 3/14* (2006.01)
  *G06F 3/01* (2006.01)
  *G06F 3/0482* (2013.01)

(52) U.S. Cl.
  CPC ............... *G06F 3/14* (2013.01); *G06F 3/011* (2013.01); *G06F 3/0482* (2013.01)

(58) Field of Classification Search
  None
  See application file for complete search history.

(56) References Cited

U.S. PATENT DOCUMENTS

2014/0164957 A1  6/2014 Shin et al.
2014/0340299 A1* 11/2014 Lee .................. G06F 3/147
                                                         345/156

(Continued)

FOREIGN PATENT DOCUMENTS

CN    104798129 A  * 7/2015  ............. G06F 3/017
CN    114341971 A  * 4/2022  ............ G06F 1/1652

(Continued)

OTHER PUBLICATIONS

Search Report and Written Opinion issued Jul. 15, 2022 in counterpart International Patent Application No. PCT/ KR2022/005678.

(Continued)

*Primary Examiner* — Duane N Taylor, Jr.
(74) *Attorney, Agent, or Firm* — Nixon & Vanderhye, P.C.

(57) ABSTRACT

An example electronic device may be configured, based on a sliding operation to make visible a second portion of a flexible display including at least a portion of a first portion of the flexible display, according to an input, in a state in which the first portion is visible to the outside, to obtain context information in a state in which the second portion is visible, identify one or more workspaces based on the context information, control the display to display a list of the one or more workspaces in a portion of the second portion, and, based on one workspace being selected from the list, control the display to display execution screens of a plurality of applications in the second portion based on the selected workspace.

18 Claims, 19 Drawing Sheets

(56) References Cited

U.S. PATENT DOCUMENTS

| | | | |
|---|---|---|---|
| 2016/0349971 A1* | 12/2016 | Chi | G09G 5/373 |
| 2017/0168769 A1 | 6/2017 | Jeon et al. | |
| 2018/0374452 A1 | 12/2018 | Choi et al. | |
| 2019/0012008 A1* | 1/2019 | Yoon | G06F 1/1652 |
| 2019/0261519 A1* | 8/2019 | Park | H04M 1/0268 |
| 2021/0216332 A1 | 7/2021 | Li | |

FOREIGN PATENT DOCUMENTS

| | | |
|---|---|---|
| JP | 2001-060134 | 3/2010 |
| KR | 10-2010-0009008 | 1/2010 |
| KR | 10-2016-0139320 | 12/2016 |
| KR | 10-2017-0048007 | 5/2017 |
| KR | 10-2017-0058220 | 5/2017 |
| KR | 10-2017-0069103 | 6/2017 |
| KR | 10-2018-0020737 | 2/2018 |
| KR | 10-2256292 | 5/2021 |
| KR | 10-2023-0051771 | 4/2023 |
| WO | 2021/137318 | 7/2021 |
| WO | 2021/141153 | 7/2021 |

OTHER PUBLICATIONS

Extended Search Report dated Sep. 16, 2024 in European Patent Application No. 22855956.3.

Jessica Cauchard et al: "m+pSpaces: virtual workspaces in the spatially-aware mobile environment" CCS '12 Proceedings of the 2012 ACM Conference on Computer and Communications Security, Sep. 21, 2012; 10 pages.

* cited by examiner

ELECTRONIC DEVICE INCLUDING FLEXIBLE DISPLAY AND METHOD FOR CONTROLLING SAME

CROSS-REFERENCE TO RELATED APPLICATIONS

This application is a continuation of International Application No. PCT/KR2022/005678 designating the United States, filed on Apr. 20, 2022, in the Korean Intellectual Property Receiving Office and claiming priority to Korean Patent Application No. 10-2021-0106643, filed on Aug. 12, 2021, in the Korean Intellectual Property Office, the disclosures of which are incorporated by reference herein in their entireties.

BACKGROUND

Field

The disclosure relates to an electronic device including a flexible display and a method of controlling the same.

Description of Related Art

As the demand for mobile communication increases and, as the degree of integration of electronic devices increases, portability of electronic devices such as mobile communication terminals may be improved, and convenience in using multimedia functions and the like may be enhanced. For example, as a display equipped with a touch screen function replaces a traditional mechanical (button type) keypad, the electronic device may be miniaturized while maintaining the function of an input device. For example, portability of the electronic device may be improved by removing the mechanical keypad from the electronic device. In an embodiment, if the display is extended as much as the area by which the mechanical keypad is removed, the electronic device including a touch screen function may provide a larger screen than the electronic device including a mechanical keypad even though it has the same size and weight as the electronic device including the mechanical keypad.

It may be more convenient to use an electronic device that displays a larger screen in surfing the web or using a multimedia function. Although a larger display may be mounted to the electronic device in order to display a larger screen, there may be restrictions in extending the size of the display in consideration of the portability of the electronic device. A display using an organic light-emitting diode or the like may secure the portability of an electronic device while providing a larger screen. For example, a display using an organic light-emitting diode (or an electronic device equipped with the same) may realize stable operation even if it is manufactured to be quite thin, so it may be mounted to an electronic device in a foldable, bendable, or rollable form.

An electronic device including a flexible display having a flexible screen size from a small screen of a smartphone to a large screen of a tablet PC or more performs multi-tasking work in various screen sizes and ratios depending on the situation.

As the screen size of the electronic device is changed, primarily used application configuration, the layout of application execution screens, or an optimized workspace may vary for each screen size or ratio.

SUMMARY

Embodiments of the disclosure provide an electronic device and a method of controlling the same capable of easily storing a workspace optimized for various screen sizes of an electronic device and providing an optimized workspace depending on a change in the screen size.

According to various example embodiments, an electronic device may include: a housing, a flexible display at least a portion of which is visible to the outside through the housing, and at least one processor operably connected to the flexible display, wherein the at least one processor may be configured, based on a sliding operation being performed, to make visible a second portion including at least a portion of a first portion of the flexible display to the outside, based on an input, in a state in which the first portion of the flexible display is visible to the outside, to: obtain context information in a state in which the second portion is visible, identify one or more workspaces based on the context information, control the display to display a list of the one or more workspaces in a portion of the second portion, and, based on one workspace being selected from the list, control the display to display execution screens of a plurality of applications in the second portion, based on the selected workspace, and wherein each of the one or more workspaces may include size information of the second portion, information about a plurality of applications to be executed, and layout information of execution screens of the plurality of applications.

A method of controlling an electronic device according to various example embodiments may include, based on a sliding operation being performed to make visible a second portion including at least a portion of a first portion of a flexible display to the outside, based on an input, in a state in which the first portion of the flexible display is visible to the outside: obtaining context information in a state in which the second portion is visible, identifying one or more workspaces, based on the context information, displaying a list of the one or more workspaces in a portion of the second portion, and, based on one workspace being selected from the list, displaying execution screens of a plurality of applications in the second portion, based on the selected workspace, and wherein each of the one or more workspaces may include size information of the second portion, information about a plurality of applications to be executed, and layout information of execution screens of the plurality of applications.

As the size of an exposed (e.g., visible) area of a flexible display changes, the electronic device according to various example embodiments of the disclosure is able to provide an optimized workspace, based on the changed size of the exposed (e.g., visible) area and context information.

In addition, according to various example embodiments of the disclosure, when the size of an exposed (e.g., visible) area of a flexible display is changed, the workspace before the change may be stored as a user-specified workspace, and then, when the size of the exposed (e.g., visible) area is restored, the stored workspace may be recommended, enabling easy switch to the workspace before changing the size of the exposed area.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
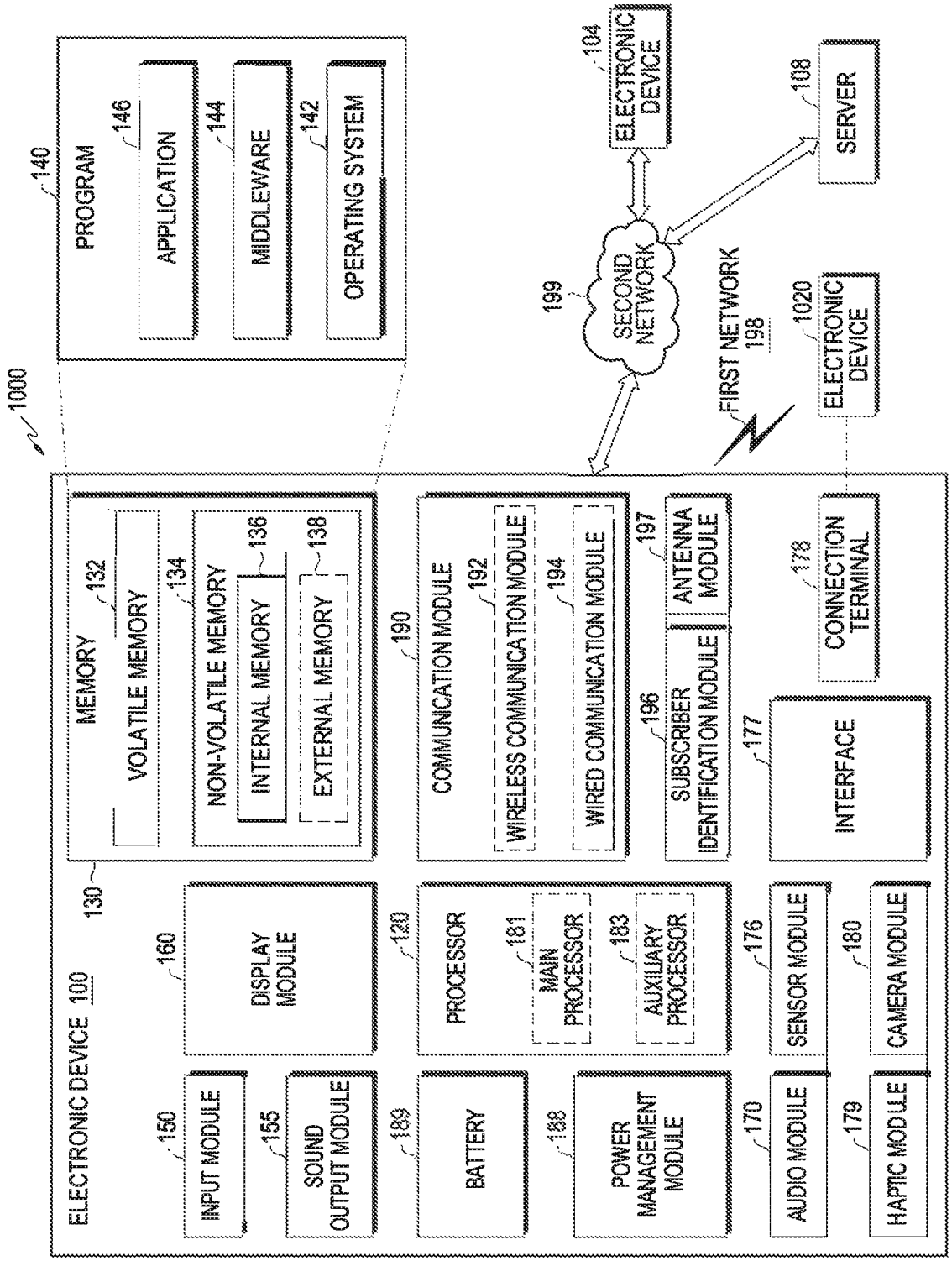
FIG. 1 is a block diagram illustrating an example electronic device in a network environment according to various embodiments.

FIG. 1 is a block diagram illustrating an example electronic device 100 in a network environment 1000 according to various embodiments. Referring to FIG. 1, the electronic device 100 in the network environment 1000 may communicate with an electronic device 1020 via a first network 198 (e.g., a short-range wireless communication network), or at least one of an electronic device 104 or a server 108 via a second network 199 (e.g., a long-range wireless communication network). According to an embodiment, the electronic device 100 may communicate with the electronic device 104 via the server 108. According to an embodiment, the electronic device 100 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 100, or one or more other components may be added in the electronic device 100. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 100 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 181 (e.g., a central processing unit (CPU) or an application processor (AP)), or an auxiliary processor 183 (e.g., a graphics processing unit (GPU), a neural processing unit (NPU), an image signal processor (ISP), a sensor hub processor, or a communication processor (CP)) that is operable independently from, or in conjunction with, the main processor 181. For example, when the electronic device 100 includes the main processor 181 and the auxiliary processor 183, the auxiliary processor 183 may be adapted to consume less power than the main processor 181, or to be specific to a specified function. The auxiliary processor 183 may be implemented as separate from, or as part of the main processor 181.

The auxiliary processor 183 may control, for example, at least some of functions or states related to at least one component (e.g., the display module 160, the sensor module 176, or the communication module 190) among the components of the electronic device 100, instead of the main processor 181 while the main processor 181 is in an inactive (e.g., sleep) state, or together with the main processor 181 while the main processor 181 is in an active (e.g., executing an application) state. According to an embodiment, the auxiliary processor 183 (e.g., an image signal processor or a communication processor) may be implemented as part of another component (e.g., the camera module 180 or the communication module 190) functionally related to the auxiliary processor 183. According to an embodiment, the auxiliary processor 183 (e.g., the neural processing unit) may include a hardware structure specified for artificial intelligence model processing. An artificial intelligence model may be generated by machine learning. Such learning may be performed, e.g., by the electronic device 100 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 100. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 100, from the outside (e.g., a user) of the electronic device 100. The input module 150 may include, for example, a microphone, a mouse, a keyboard, a key (e.g., a button), or a digital pen (e.g., a stylus pen).

The sound output module 155 may output sound signals to the outside of the electronic device 100. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 100. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 1020 (e.g., a speaker or a headphone)) directly or wirelessly coupled with the electronic device 100.

The sensor module 176 may detect an operational state (e.g., power or temperature) of the electronic device 100 or an environmental state (e.g., a state of a user) external to the electronic device 100, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 100 to be coupled with the external electronic device (e.g., the electronic device 1020) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 100 may be physically connected with the external electronic device (e.g., the electronic device 1020). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 100. According to an embodiment, the power management module 188 may be implemented as at least part of, for example, a power management integrated circuit (PMIC).

The battery 189 may supply power to at least one component of the electronic device 100. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 100 and the external electronic device (e.g., the electronic device 1020, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 100 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 100, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 100. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 100 and the external electronic device 104 via the server 108 coupled with the second network 199. Each of the external electronic devices 182 or 104 may be a device of a same type as, or a different type, from the electronic device 100. According to an embodiment, all or some of operations to be executed at the electronic device 100 may be executed at one or more of the external electronic devices 182, 104, or 108. For example, if the electronic device 100 should perform a function or a service automatically, or in response to a request from a user or another device, the electronic device 100, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 100. The electronic device 100 may provide the outcome, with or without further processing of the outcome, as at least part of a reply to the request. To that end, a cloud computing, distributed computing, mobile edge computing (MEC), or client-server computing technology may be used, for example. The electronic device 100 may provide ultra low-latency services using, e.g., distributed computing or mobile edge computing. In an embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 100 may be applied to intelligent services (e.g., smart home, smart city, smart car, or healthcare) based on 5G communication technology or IoT-related technology.

Figure 2:
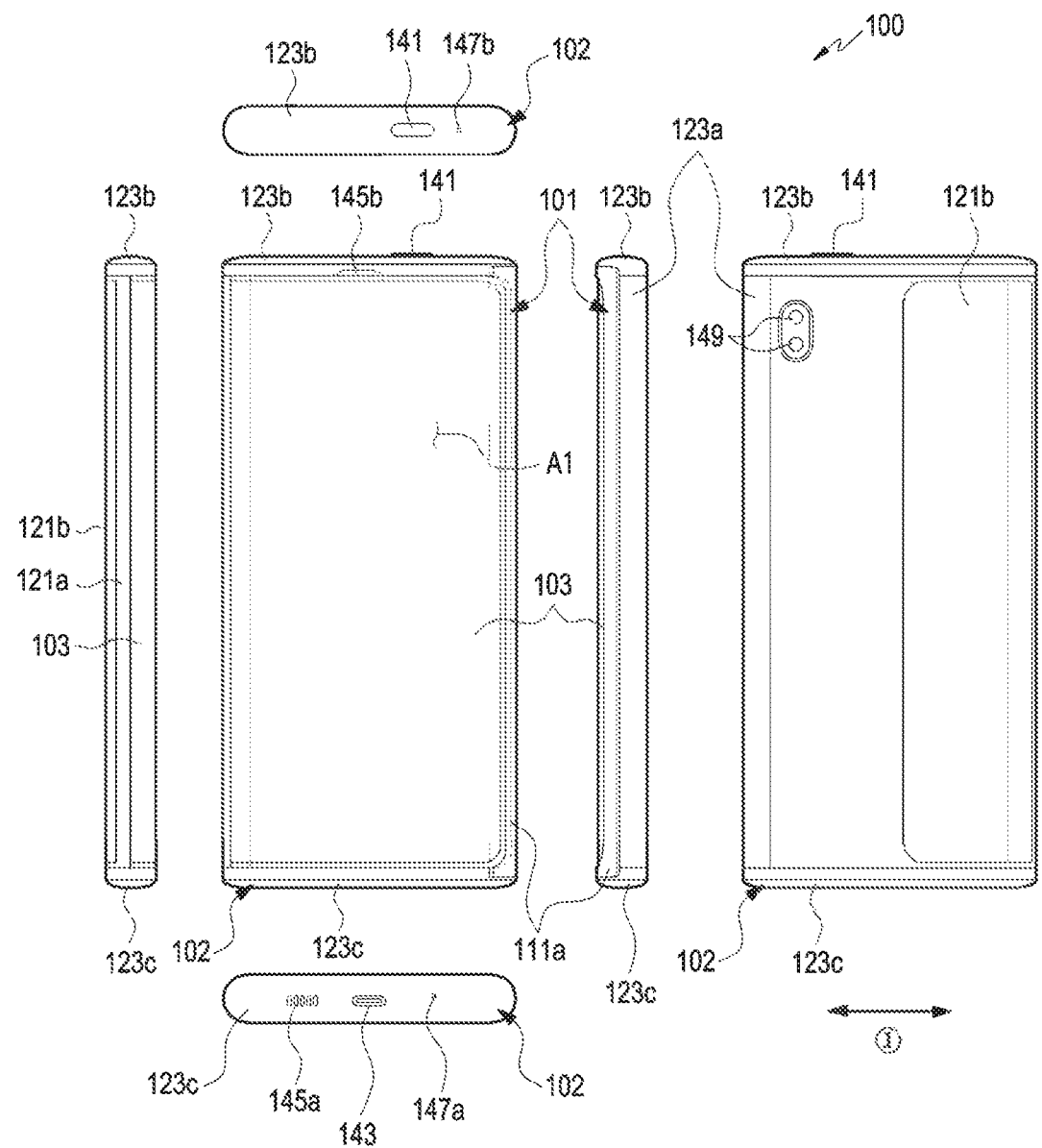
FIG. 2 is a diagram illustrating an electronic device in a state in which a portion of a flexible display is received in a housing according to various embodiments.

FIG. 2 is a diagram illustrating an electronic device in a state in which a portion (e.g., a second area A2) of a flexible display 103 is received in a second structure 102 (e.g., a housing) according to various embodiments.

Figure 3:
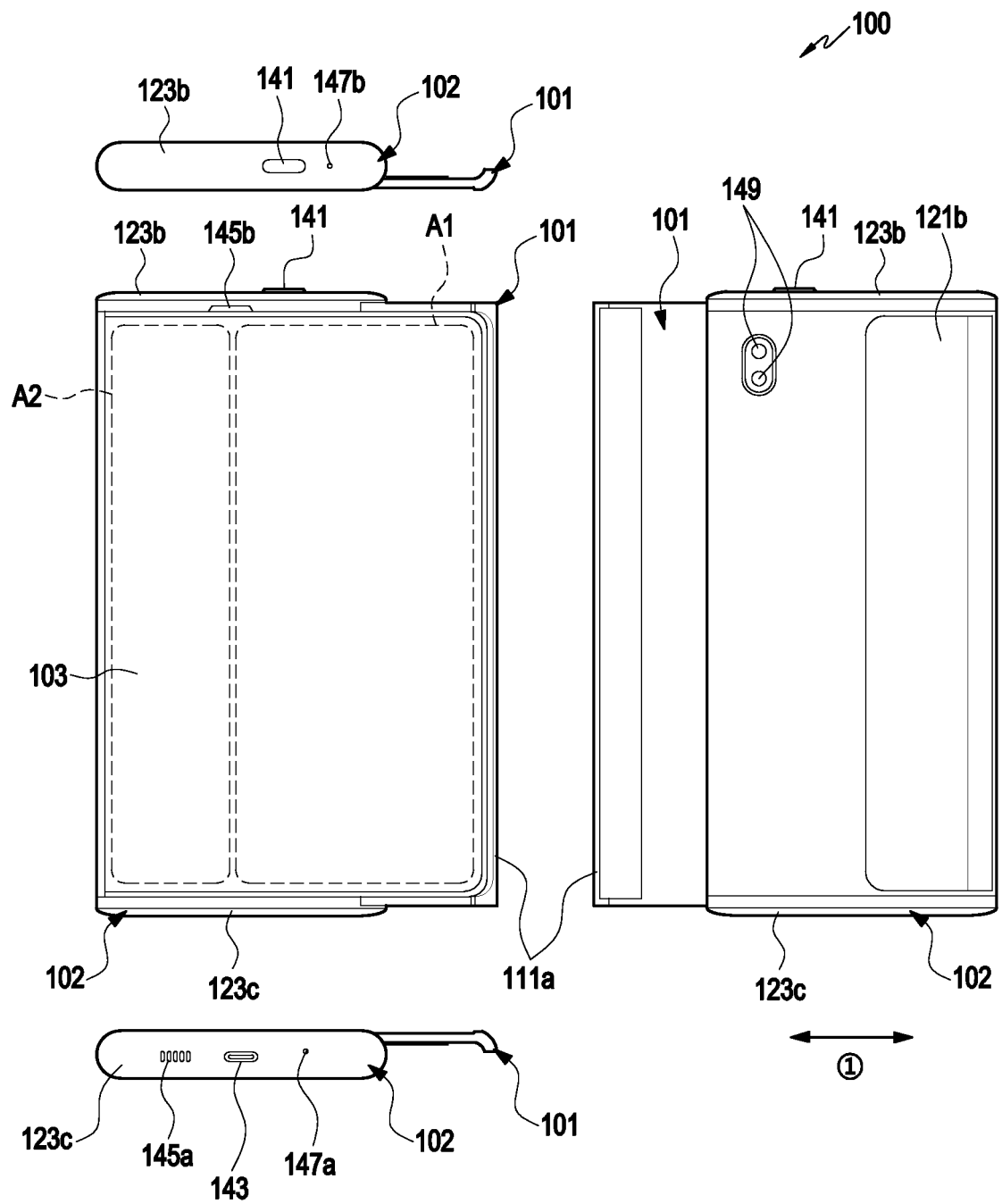
FIG. 3 is a diagram illustrating an electronic device in a state in which most of a flexible display is exposed (e.g., visible) to the outside of the housing according to various embodiments.

FIG. 3 is a diagram illustrating an electronic device in a state in which most of a flexible display 103 is exposed (e.g., visible) to the outside of a second structure 102 (e.g., a housing) according to various embodiments.

The term "exposed" as used herein in the context of a display extended from a housing, unfolded, or the like, may be used interchangeably with the term "visible". For the avoidance of doubt, as used herein, when a part of a display hidden from view is made to be visible by unfolding, extending, etc. the display, the terms "exposed" and "visible" may be used interchangeably and refer to the same or similar state of the display. For example, even in a case where the display includes a cover glass or cover layer disposed over the display, referring to the display as being exposed includes the display being visible to an outside of the electronic device.

The state shown in FIG. 2 may be refer to a state in which a first structure 101 is closed with respect to a second structure 102, and the state shown in FIG. 3 may be referred to a state in which a first structure 101 is open with respect to a second structure 102. According to an embodiment, a "closed state" or an "open state" may be referred to a state in which the electronic device is closed or opened.

Referring to FIGS. 2 and 3, an electronic device 100 may include a first structure 101 and a second structure 102 movably disposed in the first structure 101. In various embodiments, it may be interpreted as a structure in which the first structure 101 is slidably disposed on the second structure 102 in the electronic device 100. According to an embodiment, the first structure 101 may be disposed to reciprocate by a predetermined distance in a direction shown in the figure, for example, a direction indicated by an arrow ①, with respect to the second structure 102.

According to various embodiments, the first structure 101 may be referred to as, for example, a first housing, a slide part, or a slide housing, and may be disposed to reciprocate on the second structure 102. In an embodiment, the second structure 102 may be referred to as, for example, a second housing, a main part, or a main housing, and may accommodate various electrical and electronic components such as a main circuit board or a battery. A portion (e.g., a first area A1) of a display 103 may be seated on the first structure 101. In various embodiments, another portion 103 (e.g., a second area A2) of the display may be received inside the structure 102 (e.g., a slide-in operation) or exposed to the outside of the second structure 102 (e.g., a slide-out operation) as the first structure 101 moves (e.g., slides) relative to the second structure 102.

According to various embodiments, the first structure 101 may include a first plate 111a (e.g., a slide plate), and may include a first surface formed to include at least a portion of the first plate 111a and a second surface directed in the opposite direction of the first surface. According to an embodiment, the second structure 102 may include a second plate (e.g., a rear case), a first side wall 123a extending from the second plate 121a, a second side wall 123b extending from the first side wall 123a and the second plate 121a, a third side wall 123c extending from the first side wall 123a and the second plate 121a to be parallel to the second side wall 123b, and/or a rear plate 121b (e.g., a rear window). In various embodiments, the second side wall 123b and the third side wall 123c may be formed perpendicular to the first side wall 123a. According to an embodiment, the second plate 121a, the first side wall 123a, the second side wall 123b, and the third side wall 123c may be formed to be open at one side (e.g., a front face) thereof, thereby accommodating (or surrounding) at least a portion of the first structure 101. For example, the first structure 101 may be coupled to the second structure 102 such that at least a portion thereof is surrounded, and may slide in a direction parallel to the first surface or the second surface, for example, in the direction of arrow ①, while being guided by the second structure 102.

According to various embodiments, the second side wall 123b or the third side wall 123c may be omitted. According to an embodiment, the second plate 121a, the first side wall 123a, the second side wall 123b, and/or the third side wall 123c may be configured as separate structures to be combined or assembled. The rear plate 121b may be coupled to surround at least a portion of the second plate 121a. In various embodiments, the rear plate 121b may be formed to be substantially integral with the second plate 121a. According to an embodiment, the second plate 121a or the rear plate 121b may cover at least a portion of the flexible display 103. For example, the flexible display 103 may be at least partially received inside the second structure 102, and the second plate 121a or the rear plate 121b may cover the portion of the flexible display 103 received inside the second structure 102.

According to various embodiments, the first structure 101 may move relative to the second structure 102 in a first direction (e.g., the direction ①parallel to the second plate 121a (e.g., a rear case) and the second side wall 123b between an open state and a closed state, and the first structure 101 may move to be placed at a first distance from the first side wall 123a in the closed state and to be placed at a second distance, which is greater than the first distance, from the first side wall 123a in the open state. In various embodiments, in the closed state, the first structure 101 may be positioned to surround a portion of the first side wall 123a.

According to various embodiments, the electronic device 100 may include a display 103, a key input device 141, a connector hole 143, audio modules 145a, 145b, 147a, and 147b, or a camera module 149. Although not shown, the electronic device 100 may further include an indicator (e.g., an LED device) or various sensor modules.

According to various embodiments, the display 103 may include a first area A1 and a second area A2. In an embodiment, the first area A1 may extend substantially across at least a portion of the first surface so as to be disposed on the first surface. The second area A2 may extend from the first area A1, and may be inserted or received inside the second structure 102 (e.g., a housing) or may be exposed to the outside of the structure 102 as the first structure 101 slides. As will be described later, the second area A2 may move while being substantially guided by a roller mounted to the second structure 102 so as to be received inside the second structure 102 or exposed to the outside thereof. For example, while the first structure 101 slides, a portion of the second area A2 may be deformed into a curved shape at a position corresponding to the roller.

According to various embodiments, if the first structure 101 moves from the closed state to the open state, the second area A2 may be gradually exposed to the outside of the second structure 102 to form a substantially flat surface together with the first area A1 when viewed from above of the first plate 111a (e.g., a slide plate). The display 103 may be coupled to or disposed adjacent to a touch sensing circuit, a pressure sensor capable of measuring the intensity (pressure) of a touch, and/or a digitizer that detects a magnetic field type stylus pen. In an embodiment, the second area A2 may be at least partially received inside the second structure 102, and a portion of the second area A2 may be exposed to the outside even in the state shown in FIG. 1 (e.g., the closed state). In various embodiments, irrespective of the closed state or the open state, a portion of the exposed second area A2 may be positioned on a roller, and a portion of the second area A2 may remain in a curved shape at a position corresponding to the roller.

The key input device 141 may be disposed on the second side wall 123b or the third side wall 123c of the second structure 102. The electronic device 100 may be designed to exclude the illustrated key input device 141 or include additional key input device(s) depending on the appearance and usage state. In various embodiments, the electronic device 100 may include a key input device that is not shown, for example, a home key button or a touch pad disposed around the home key button. According to an embodiment, at least a portion of the key input device 141 may be positioned in an area of the first structure 101.

According to various embodiments, the connector hole 143 may be omitted depending on an embodiment, and may accommodate a connector (e.g., a USB connector) for transmitting/receiving power and/or data to and from an external electronic device. Although not shown, the electronic device 100 may include a plurality of connector holes 143, and some of the plurality of connector holes 143 may function as connector holes for transmitting and receiving audio signals to and from an external electronic device. In the illustrated embodiment, although the connector hole 143 is disposed on the third side wall 123c, the disclosure is not limited thereto, and the connector hole 143 or a connector hole that is not shown may be disposed on the first side wall 123a or the second side wall 123b.

According to various embodiments, the audio modules 145a, 145b, 147a, and 147b may include speaker holes 145a and 145b or microphone holes 147a and 147b. One of the speaker holes 145a and 145b may be provided as a receiver hole for a voice call, and the other may be provided as an external speaker hole. A microphone for obtaining an external sound may be disposed in the microphone holes 147a and 147b, and in various embodiments, a plurality of microphones may be disposed therein to detect the direction of a sound. In various embodiments, the speaker holes 145a and 145b and the microphone holes 147a and 147b may be implemented as a single hole, or a speaker (e.g., a piezo speaker) may be included without the speaker holes 145a and 145b. According to an embodiment, the speaker hole indicated by the reference number "145b" may be disposed in the first structure 101 so as to be utilized as a receiver hole for a voice call, and the speaker hole indicated by the reference number "145a" (e.g., an external speaker hole) or microphone holes 147a and 147b may be disposed in the second structure 102 (e.g., one of the side surfaces 123a, 123b, and 123c).

The camera module 149 may be provided in the second structure 102 and may photograph a subject in a direction opposite to the first area A1 of the display 103. The electronic device 100 may include a plurality of camera modules 149. For example, the electronic device 100 may include a wide-angle camera, a telephoto camera, or a close-up camera, and according to an embodiment, measure a distance to a subject by including an infrared projector and/or an infrared receiver. The camera module 149 may include one or more lenses, an image sensor, and/or an image signal processor. Although not shown, the electronic device 100 may further include a camera module (e.g., a front camera) for photographing a subject in a direction opposite to the first area A1 of the display 103. For example, the front camera may be disposed around the first area A1 or in an area overlapping the display 103, and in the case where the front camera is disposed in the area overlapping the display 103, the front camera may photograph a subject by transmitting through the display 103.

According to various embodiments, an indicator (not shown) of the electronic device 100 may be disposed in the first structure 101 or the second structure 102, and include a light-emitting diode to provide state information of the electronic device 100 as a visual signal. A sensor module (not shown) of the electronic device 100 may generate electrical signals or data values corresponding to the internal operation state of the electronic device 100 or an external environment state. The sensor module may include, for example, a proximity sensor, a fingerprint sensor, or a biometric sensor (e.g., an iris/face recognition sensor or an HRM sensor). In an embodiment, the sensor module may further include at least one of, for example, a gesture sensor, a gyro sensor, an atmospheric pressure sensor, a magnetic sensor, an acceleration sensor, a grip sensor, a color sensor, an IR (infrared) sensor, a temperature sensor, a humidity sensor, or an illuminance sensor.

Figures 4A, 4B, 4C:
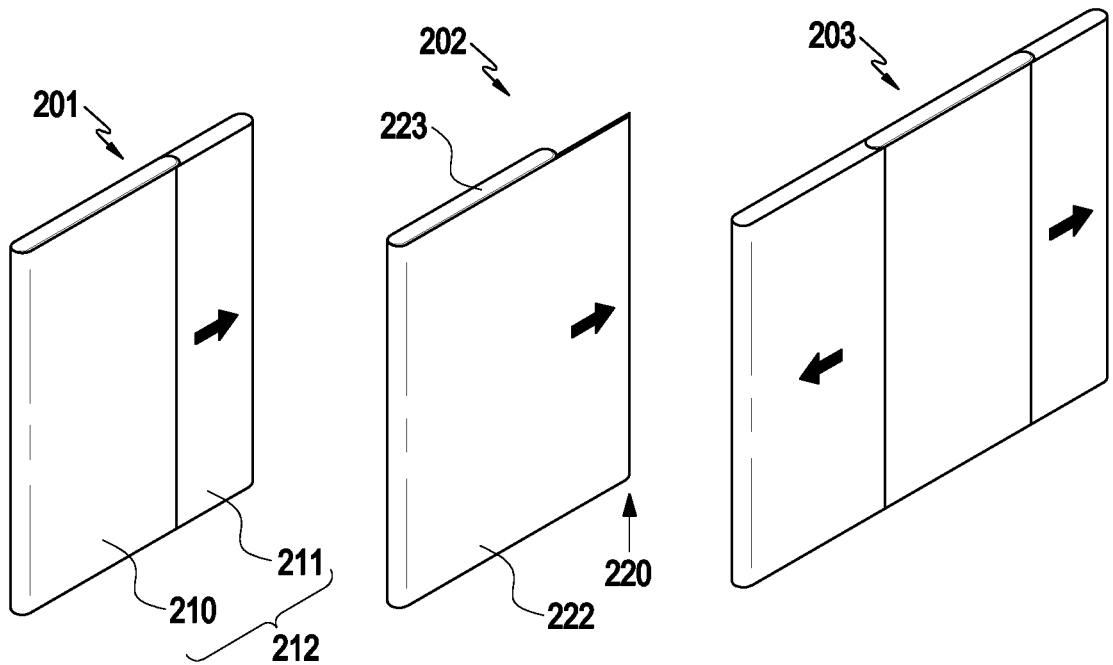
FIG. 4A is diagram illustrating various types of slidable electronic devices according to various embodiments.
FIG. 4B is diagram illustrating various types of slidable electronic devices according to various embodiments.
FIG. 4C is diagram illustrating various types of slidable electronic devices according to various embodiments.

FIG. 4A is diagram illustrating various types of slidable electronic devices according to various embodiments.

FIG. 4B is diagram illustrating various types of slidable electronic devices according to various embodiments.

FIG. 4C is diagram illustrating various types of slidable electronic devices according to various embodiments.

Figure 4D:
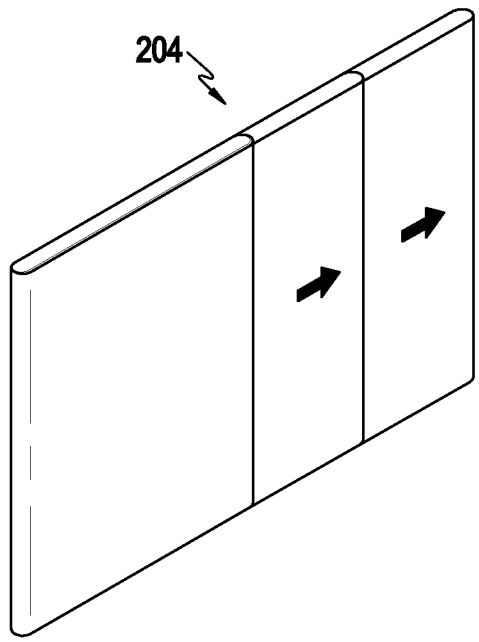
FIG. 4D is diagram illustrating various types of slidable electronic devices according to various embodiments.

FIG. 4D is diagram illustrating various types of slidable electronic devices according to various embodiments. According to various embodiments, the electronic device 201, 202, 203, or 204 in FIG. 4 (e.g., the electronic device 100 in FIG. 1) may include a housing, a display (e.g., the display module 160 in FIG. 1), and at least one processor (e.g., the processor 120 in FIG. 1) operably connected to the display.

According to various embodiments, at least a portion of the display may be exposed to the outside through the housing. According to various embodiments, the display may include one or more displays. According to various embodiments, the display may include an unfolded display (e.g., a flat display or an edge display) that is unable to be folded or a flexible display (e.g., a foldable display, a rollable display, or a stretchable display). Although the display will be described as a flexible display below, the disclosure is not limited thereto, and the unfolded display may be applied thereto.

According to various embodiments, at least one processor capable of executing and controlling functions of the electronic device 201, 202, 203, or 204 and a memory (e.g., the memory 130 in FIG. 1) may be disposed inside the housing.

According to various embodiments, the state in which an exposed area of the flexible display is minimal may be referred to as a "closed state (or folded state)" and the state in which the exposed area of the flexible display is maximal may be referred to as an "open state (or unfolded state)".

According to various embodiments, referring to FIG. 4A, at least a portion of the flexible display may enter the housing or exit from the housing according to a sliding operation. For example, if a sliding extension command is received in the closed state of the slidable electronic device 201, a portion of the flexible display positioned inside the housing may slide to the outside of the housing to enter the open state. For example, an exposed portion 210 of the flexible display when the electronic device 201 is in the closed state may be referred to as a first portion, and an exposed portion of the flexible display when the electronic device 201 is in the open state may be referred to as a second portion. For example, the second portion 212 may have the area obtained by adding an extended area 211 of the flexible display due to a sliding extension operation to the first portion. For example, the flexible display disposed on the housing of the flexible display may be fixed.

According to various embodiments, if a sliding reduction command is received in the open state of the slidable electronic device 201, a portion of the flexible display positioned outside the housing may slide to the inside of the housing to enter the closed state. For example, an exposed portion 212 of the flexible display when the electronic device 201 is in the open state may be referred to as a first portion, and an exposed portion 210 of the flexible display when the electronic device 201 is in the closed state may be referred to as a second portion. For example, the exposed portion 210 of the flexible display after a portion 211 of the flexible display enters the housing according to the sliding reduction operation in the first portion may be the second portion.

According to various embodiments, referring to FIG. 4B, the flexible display may be disposed to surround at least a portion of a front surface, one side surface, and a rear surface of the electronic device 202.

For example, if a sliding extension command is received in the closed state, the slidable electronic device 202 may move the flexible display such that an edge portion 220 of the flexible display disposed on the front surface of the electronic device 202 moves to escape from the housing of the electronic device 202. For example, the electronic device 202 may drive a roller (not shown) for moving the flexible display. A portion of the flexible display disposed on the rear surface 223 of the electrical device 202 may move toward the front surface of the electronic device 202 according to the movement of the flexible display, so that the exposed portion 222 of the flexible display may be extended. For example, the flexible display disposed on the housing of the flexible display may move. According to various embodiments, the state in which the exposed portion 222 of the flexible display is maximal may be referred to as an open state.

According to various embodiments, if a sliding reduction command is received in the open state, the slidable electronic device 202 may drive a roller (not shown) such that the edge portion 220 of the flexible display arranged on the front surface of the electronic device 202 moves in the direction from the area outside the housing to the housing. A portion of the flexible display disposed on the front surface of the electronic device 202 may move to the rear surface 223 of the electronic device 202 according to the driving of the roller, so that the exposed portion of the flexible display may be reduced. The state in which the exposed portion of the flexible display is minimal may be referred to as a closed state.

According to various embodiments, the flexible display of the slidable electronic device 202 may be disposed so as to enter the housing of the electronic device 202, instead of the rear surface of the electronic device 202, from the area surrounding one side surface of the electronic device 202.

Although it has been illustrated in FIGS. 4A and 4B that the flexible display is extend to the right of the electronic device 201 or 202, the disclosure is not limited thereto. For example, the flexible display may be extended or reduced to the right or left of the electronic device 201 or 202. As an embodiment, if the electronic device 201 or 202 is arranged horizontally, the flexible display may be extended or reduced to the upper or lower side of the electronic device 201 or 202.

Although it has been illustrated in FIGS. 4A and 4B that a long side of the flexible display of the rectangular electronic device 201 or 202 moves such that the flexible display is extended or reduced, the disclosure is not limited thereto. For example, a short side of the flexible display of the rectangular electronic device 201 or 202 may move such that the flexible display is extended or reduced.

Although it has been illustrated that the rectangular electronic devices 201 and 202 are disposed vertically (e.g., in a portrait mode) so that the short side of the flexible display move upwards or downwards to extend or reduce the flexible display, the disclosure is not limited thereto. For example, the rectangular electronic devices 201 and 202 may be disposed horizontally (e.g., in a landscape mode) so that the short side of the flexible display moves to the right or left to extend or reduce the flexible display.

Although the electronic devices 201 and 202 are illustrated in a rectangular shape in FIGS. 4A and 4B, the disclosure is not limited thereto. For example, the electronic devices 201 and 202 may have the shape of a square. For example, the electronic devices 201 and 202 may move one side of the flexible display up, down, right, or left, thereby extending or reducing the flexible display.

Although it has been illustrated in FIGS. 4Aa and 4B that the flexible display is extended or reduced only in one direction of the electronic devices 201 and 202, the disclosure is not limited thereto. For example, referring to FIG. 4C, the slidable electronic device 203 may extend or reduce the flexible display in both directions.

According to various embodiments, the electronic device 203 may extend or reduce the flexible display only in one of the two directions, or extend or reduce the flexible display in both directions.

Although it has been illustrated in FIG. 4C that the long sides at both sides of the flexible display of the rectangular electronic device 203 move in both directions (e.g., to the left and right) such that the flexible display is extended or reduced, the disclosure is not limited thereto. For example, the short sides at both sides of the flexible display of the rectangular electronic device 203 may move in both directions (e.g., upwards and downwards) such that the flexible display is extended or reduced.

Although the rectangular electronic device 203 is illustrated as being vertically arranged in FIG. 4C, it may be arranged horizontally. According to various embodiments, the electronic device 203 may also have the shape of a square.

Although it has been illustrated in FIG. 4C that the flexible display is extended or reduced bidirectionally, the disclosure is not limited thereto. For example, the slidable electronic device may extend or reduce the flexible display in two directions (e.g., in one of the left direction or the right direction and in one of the upward direction or the downward direction), instead of extending or reducing the same bidirectionally.

For example, the electronic device slidable in two directions may extend or reduce the flexible display in the left and upward directions, in the left and downward directions, in the right and upward directions, or in the right and downward directions.

According to various embodiments, the slidable electronic device may extend or reduce the flexible display through a sliding operation of a portion of the flexible display, which is disposed inside the housing in two directions. As an embodiment, the electronic device may perform extension or reduction of the flexible display in one direction through a sliding operation of a portion of the flexible display disposed inside the housing as shown in FIG. 4A, and perform extension or reduction of the flexible display in another direction by moving the flexible display to the front surface or the rear surface of the electronic device while the flexible display is surrounding at least a portion of the front surface, one side surface, and the rear surface of the electronic device as shown in FIG. 4B.

According to various embodiments, the flexible display may be extended or reduced in three or four directions, as well as in two directions.

According to various embodiments, referring to FIG. 4D, the slidable electronic device 204 may extend or reduce the flexible display in stages. According to various embodiments, the operation in which the flexible display is extended or reduced in stages will be described in greater detail below with reference to FIG. 9.

Figure 5:
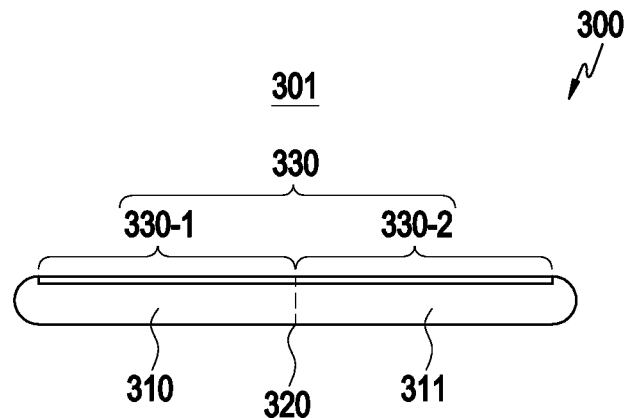
FIG. 5 is a diagram illustrating various examples of folding states of an electronic device where the electronic device includes a two-sided foldable display according to various embodiments.
Figure 5:
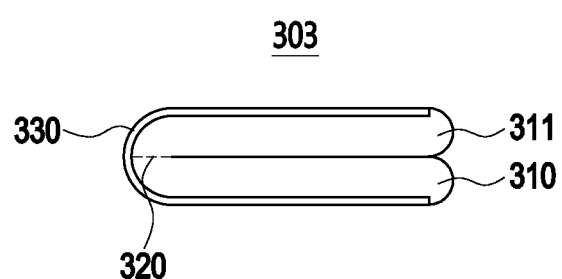
Figure 5:
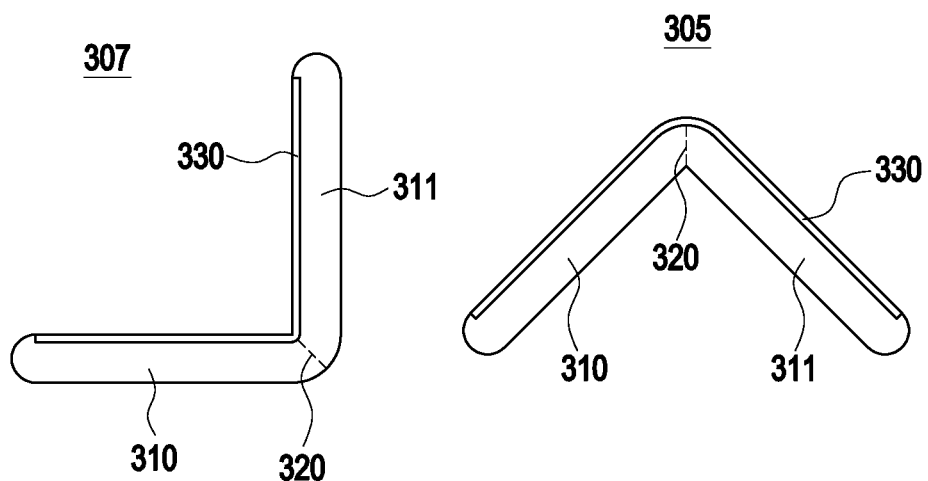
Figure 6:
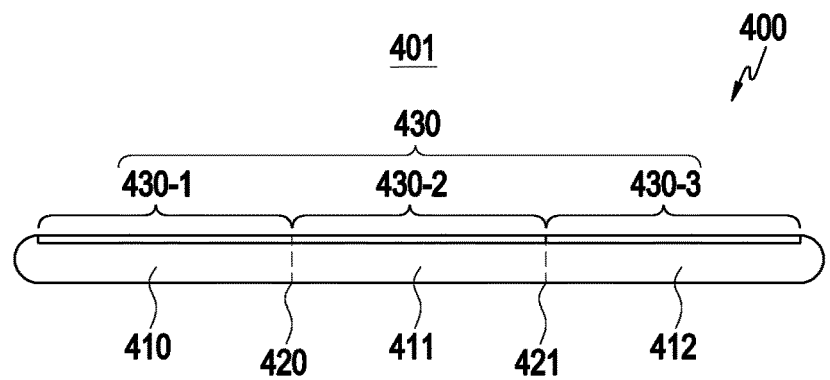
FIG. 6 is a diagram illustrating various examples of folding states of an electronic device where the electronic device includes a three-sided foldable display according to various embodiments.
Figure 6:
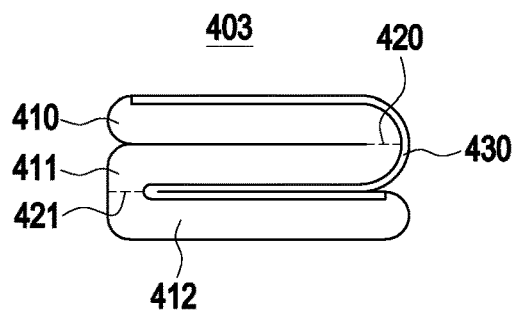
Figure 6:
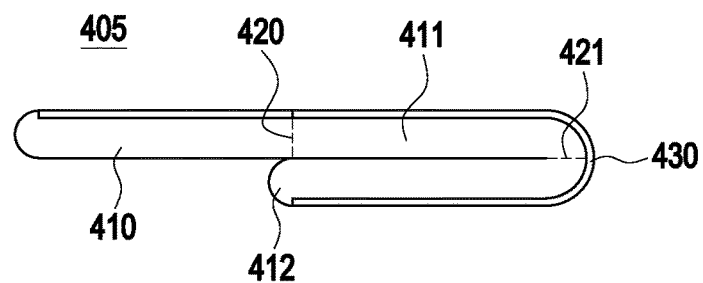
Figure 6:
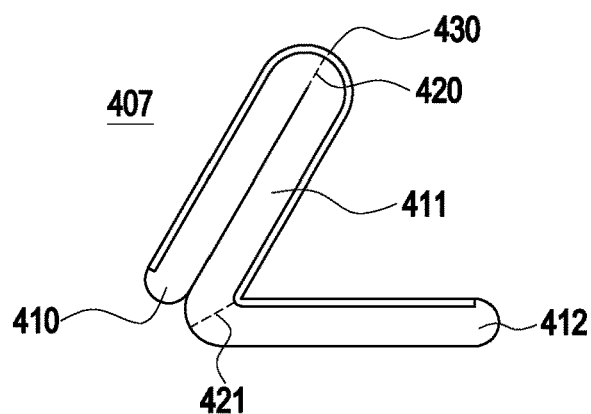

According to various embodiments, although it has been illustrated in FIGS. 2 to 4D that the electronic device may perform a sliding operation, the electronic device may also be the electronic device including a foldable display illustrated, for example, in FIGS. 5 and 6.

FIG. 5 is a diagram illustrating various examples of folding states of an electronic device in the case where the electronic device includes a two-sided foldable display according to various embodiments.

FIG. 6 is a diagram illustrating various examples of folding states of an electronic device in the case where the electronic device includes a three-sided foldable display according to various embodiments.

According to various embodiments, the electronic device 100 may include two or more housing structures (e.g., the first housing 310 and the second housing 311 in FIG. 5 or the first housing 410, the second housing 411, and the third housing 412 in FIG. 6) each rotatably connected and a flexible display (e.g., the display 330 in FIG. 5 or the display 430 in FIG. 6), and a plurality of folding states may be defined according to at least one of whether or not at least one housing is folded (e.g., the shape in which at least one housing is fully folded or fully unfolded), the rotation state of at least one housing, the angle between the housings based on a hinge (e.g., the angle between the first portion of the first housing 310 and the second portion of the second housing 311 based on the hinge 320 in FIG. 5, the angle between the first portion of the first housing 410 and the second portion of the second housing 411 based on the first hinge 420 in FIG. 6, or the angle between the second portion of the second housing 411 and the third portion of the third housing 412 based on the second hinge 421 in FIG. 6), the direction of the electronic device 100 (e.g., the direction in which the electronic device is placed based on the ground), the degree to which the electronic device 100 is tilted, or an active portion of the flexible display (e.g., the display 330 in FIG. 5 or the display 430 in FIG. 6).

For example, the various folding states of the electronic device 100 may include a (half fold) form in which the electronic device (e.g., the display 330 in FIG. 5) forms two areas as shown in FIG. 5 or a form in which the electronic device (e.g., the display 430 in FIG. 6) forms three areas (e.g., tri-fold, z-fold, or single open gate fold) as shown in FIG. 6. The disclosure is not limited thereto, a form in which the electronic device (e.g., the display (not shown) forms four areas (e.g., double parallel reverse fold, double parallel fold, double gate fold, roll fold, accordion fold, or half fold-then-half fold) and a form in which the electronic device (e.g., the display (not shown) forms four or more areas (e.g., half fold-then-tri-fold) may be included.

According to various embodiments, in the case where the electronic device 100 includes a flexible display 330 capable of forming two areas, referring to 300 illustrated in FIG. 5 illustrating the folding state of the electronic device 100, the electronic device 100 may include a first housing 310, a second housing 311, a hinge 320, and a display 330.

According to various embodiments, the first housing 310 and the second housing 311 may be connected. According to various embodiments, the first housing 310 and the second housing 311 may be connected by the hinge 320, and the first housing 310 and the second housing 311 may be pivotably or rotatably connected about (or based on) the hinge 320.

According to various embodiments, the display 330 may be exposed to the outside through a first portion of the first housing 310 and a second portion of the second housing 311. For example, the display 330 may be disposed on the first housing 310 and the second housing 311 across the hinge 320. According to various embodiments, the display 330 may include a first portion 330-1 of the display disposed in the first portion of the first housing 310, and a second portion 330-2 of the display disposed in the second portion of the second housing 311.

According to various embodiments, the display 330 may be a flexible display. For example, the display 330 may be folded or unfolded as the first housing 310 or the second housing 311 rotates about the hinge 320. Hereinafter, although examples in which the display 330 is folded or unfolded will be described, the disclosure is not limited thereto. For example, the display 330 may be implemented to be bent, and the examples in which the display 330 is folded or unfolded may be applied, in the same or a similar manner, to the examples in which the display 330 is implemented to be bent.

According to an embodiment, 301 may indicate the state in which the electronic device 100 is fully unfolded, for example, the state in which the second housing 311 is unfolded with respect to the first housing 310. In an embodiment, in the fully unfolded state of the electronic device 100, the direction in which the first portion of the first housing 310 is directed may be the same as the direction in which the second portion of the second housing 311 is directed. In the fully unfolded state of the electronic device 100, the entire front surfaces 330-1 and 330-2 of the display 330 may be exposed to the outside.

According to various embodiments, in the fully unfolded state of the electronic device 100, a processor (e.g., the processor 120) of the electronic device 100 may display execution screens of functions of the electronic device 100 through the first portion 330-1 of the display 330 and the second portion 330-2 of the display 330.

According to an embodiment, 303 may indicate a fully out-folded state of the electronic device 100 such that the first housing 310 faces the second housing 311 with respect to the hinge 320. In an embodiment, in the fully out-folded state of the electronic device 100, the direction in which the first portion of the first housing 310 is directed may be opposite the direction in which the second portion of the second housing 311 is directed. According to various embodiments, in the fully out-folded state of the electronic device 100, the first housing 310 may face the second housing 311, and the first portion 330-1 and the second portion 330-2 of the display 330 may be exposed to face each other.

According to various embodiments, in the fully out-folded state of the electronic device 100, a portion among the first portion 330-1 of the display 330 and the second portion 330-2 of the display 330 to be activated and information (e.g., execution screens of functions of the electronic device 100) to be displayed in the activated portion may be determined based on the direction in which the electronic device 100 is placed and an inclination value of the electronic device 100. For example, execution screens of functions of the electronic device 100 may be displayed at least one of the first portion 330-1 or the second portion 330-2 of the display 330, which is activated based on the direction in which the electronic device 100 is placed and the inclination value of the electronic device 100.

According to an embodiment, 305 may indicate a semi-out-folded state of the electronic device 100 in which the first portion of the first housing 310 and the second portion of the second housing 311 have an obtuse angle about the hinge 320.

According to various embodiments, in the semi-out-folded state of the electronic device 100 in which the first portion of the first housing 310 and the second portion of the second housing 311 have an obtuse angle, a portion among the first portion 330-1 of the display 330 and the second portion 330-2 of the display 330 to be activated and information (e.g., execution screens of functions of the electronic device 100) to be displayed in the activated portion may be determined based on the direction in which the electronic device 100 is placed and an inclination value of the electronic device 100.

According to various embodiments, in the fully out-folded state of the electronic device 100, a portion among the first portion 330-1 of the display 330 and the second portion 330-2 of the display 330 to be activated and information (e.g., execution screens of functions of the electronic device 100) to be displayed in the activated portion may be determined based on the direction in which the electronic device 100 is placed and an inclination value of the electronic device 100.

According to an embodiment, 307 may indicate a semi-in-folded state of the electronic device 100 in which the first portion of the first housing 310 and the second portion of the second housing 311 have an acute angle about the hinge 320.

According to various embodiments, in the semi-in-folded state of the electronic device 100 in which the first portion of the first housing 310 and the second portion of the second housing 311 have an acute angle, a portion among the first portion 330-1 of the display 330 and the second portion 330-2 of the display 330 to be activated and information (e.g., execution screens of functions of the electronic device 100) to be displayed in the activated portion may be determined based on the direction in which the electronic device 100 is placed and an inclination value of the electronic device 100.

Although it has been illustrated in FIG. 5 that the first portion 330-1 and the second portion 330-2 of the display, which are disposed on the left and right, rotate about the hinge 320, which is disposed in the vertical direction of the electronic device 100, to be fold, according to various embodiments, the electronic device may be implemented to have a hinge that is disposed in the horizontal direction so that the first portion 330-1 and in which the second portion 330-2 of the display, which are respectively disposed in the upper and lower portions of the hinge, rotate to be folded.

According to various embodiments, in the case where the electronic device 100 includes a flexible display 430 capable of forming three areas, referring to 400 illustrated in FIG. 6 illustrating the folding state of the electronic device 100, the electronic device 100 may include a first housing 410, a second housing 411, a third housing 412, a first hinge 420, a second hinge 421, and a display 430.

According to various embodiments, the first housing 410, the second housing 411, and the third housing 412 may be connected. One side of the first housing 410 and one side of the second housing 411 may be connected, and one side of the second housing 411 and one side of the third housing 412 may be connected. According to various embodiments, the first housing 410 and the second housing 411 may be connected by a first hinge 420, and the first housing 410 and the second housing 411 may be pivotably or rotatably connected about (or based on) the first hinge 420. According to various embodiments, the second housing 411 and the third housing 412 may be connected by a second hinge 421, and the second housing 411 and the third housing 412 may be rotatably connected about the second hinge 421.

According to various embodiments, the display 430 may be exposed to the outside through a first portion of the first housing 410, a second portion of the second housing 411, and a third portion of the third housing 412. For example, the display 430 may be disposed on the first housing 410, the second housing 411, and the third housing 412 across the hinge 420. According to various embodiments, the display 430 may include a first portion 430-1 of the display disposed in the first portion of the first housing 410, a second portion 430-2 of the display disposed in the second portion of the second housing 411, and a third portion 430-3 of the display disposed in the third portion of the third housing 412.

According to various embodiments, the display 430 may be a flexible display. For example, the display 430 may be folded or unfolded according to rotation of the first housing 410 or the second housing 411 about the first hinge 420, or rotation of the second housing 411 or the third housing 412 about the second hinge 421. Hereinafter, although examples in which the display 430 is folded or unfolded will be described, the disclosure is not limited thereto. For example, the display 430 may be implemented to be bent, and the examples in which the display 430 is folded or unfolded may be applied, in the same or a similar manner, to the examples in which the display 430 is implemented to be bent.

According to various embodiments, 401 may indicate a fully unfolded state of the electronic device, for example, the state in which the first housing 410 and the third housing 412 are fully folded with respect to the second housing 411. According to various embodiments, in the fully unfolded state of the electronic device 100, the direction in which the first portion of the first housing 410 is directed, the direction in which the second portion of the second housing 411 is directed, and the direction in which the third portion of the third housing 412 is directed may be the same. According to various embodiments, in the fully unfolded state of the electronic device 100, the display 430 may be exposed to the outside. For example, in the fully unfolded state of the electronic device 100, the entire front surfaces 430-1, 430-2, and 430-3 of the display 430 may be exposed to the outside.

According to various embodiments, in the fully unfolded state of the electronic device 100, a processor (e.g., the processor 120) of the electronic device 100 may display execution screens of functions of the electronic device 100 through the first portion 430-1, the second portion 430-2, and the third portion 430-3 of the display 430.

According to an embodiment, 403 may indicate a fully folded state of the electronic device 100. In the fully folded state of the electronic device 100, the direction in which the first portion of the first housing 410 is directed may be the same as the direction in which the third portion of the third housing 412 is directed, and the direction in which the second portion of the second housing 411 is directed may be opposite the direction in which the first housing 410 and the third housing 412 is directed. In the fully folded state of the electronic device 100, the second portion of the second housing 411 may oppose (or face) the first portion of the first housing 410 and the third portion of the third housing 412, only the first portion 430-1 of the display may be exposed to the outside, and the second portion 430-2 and the third portion 430-3 of the display may not be exposed to the outside. According to various embodiments, if the folding directions are different, in the fully folded state, only the third portion 430-3 of the display may be exposed to the outside, and the first portion 430-1 and the second portion 430-2 of the display may not be exposed to the outside.

In an embodiment, 405 may indicate the state in which the first housing 410 is unfolded with respect to the second housing 411 and in which only a part of the third housing 412 is fully folded with respect to the second housing 411 (partially and fully folded state). According to various embodiments, in the partially and fully folded state, the direction in which the first portion of the first housing 410 is directed may be the same as the direction in which the second portion of the second housing 411 is directed, and the direction in which second portion of the second housing 411 may be opposite the direction in which the third portion of the third housing 412 is directed. According to various embodiments, in the partially and fully folded state of the electronic device 100, the second housing 411 may face the third housing 412, the first portion 430-1 of the display 430 and the second portion 430-2 of the display 430 may be exposed in the same direction, and the third portion 430-3 of the display may be exposed to oppose the second portion 430-2.

According to various embodiments, in the partially and fully folded state of the electronic device 100, a processor (e.g., processor 120) of the electronic device 100 may determine a portion to be activated and information (e.g., execution screens of functions of the electronic device 100) to be displayed in the activated portion, based on the direction in which the electronic device 100 is placed and an inclination value of the electronic device 100. For example, the processor (e.g., the processor 120) of the electronic device 100 may display execution screens of functions of the electronic device 100 through the first portion 430-1 of the display 430 and the second portion 430-2 of the display 430, based on the direction in which the electronic device 100 is placed and the inclination value of the electronic device 100, or display execution screens of functions of the electronic device 100 through the third portion 430-3 of the display.

According to various embodiments, the second housing 411 and the third housing 412 may be unfolded, whereas the first housing 410 may be in the fully folded state, and although 405 illustrates and describes the out-folded form, an in-folded form may also be implemented. For example, in the case where the first housing 410 and the second housing 411 are in-folded about the first hinge 420 and where the second housing 411 and the third housing 412 are unfolded, only the third portion 430-3 of the display may be exposed to the outside.

In an embodiment, 407 may indicate the state in which the first housing 410 and the second housing 411 are fully folded and in which the second housing 411 and the third housing 412 stand at a certain angle. According to various embodiments, the third housing 412 may be in contact with the ground to serve as a support, and a processor (e.g., the processor 120) of the electronic device 100 may activate the first portion 430-1 of the display 430 and determine information to be displayed in the activated first portion 430-1 of the active display 430.

Although it has been illustrated in FIG. 6 that the first portion 430-1, the second portion 430-2, and the third portion 430-3 of the display, which are disposed on the left and right of the first hinge 420 and second hinge 421 disposed on the electronic device 100 in the vertical direction, rotate to be folded, according to various embodiments, each of the first hinge 420 and the second hinge 421 of the electronic device 100 may be disposed in the horizontal direction, and the first portion 430-1, the second portion 430-2, and the third portion 430-3 of the display, which are disposed in the upper and lower portions of the first hinge 420 and the second hinge 421, may be configured to rotate to be folded.

The folding states illustrated in FIGS. 5 and 6 are simply examples, and the disclosure is not limited thereto, and various folding states are possible based on at least one of the unfolded state, the in-folded state, the out-folded state, the angle between the housings, the direction in which the electronic device is placed, or the degree of inclination of the electronic device.

Although not shown in FIGS. 5 and 6, in an embodiment, the electronic device 100 may include at least one sensor for detecting a folding state. According to various embodiments, at least one sensor may include at least one of a Hall sensor, a proximity sensor, an angle sensor, a load cell, an infrared sensor, a pressure sensor, an acceleration sensor, a gyro sensor, and an electromagnetic sensor. However, at least one sensor for detecting the folding state of the electronic device 100 is not limited to the above-described examples.

According to various embodiments, if there is a pre-stored function corresponding to an authenticated space in which the electronic device 100 is located and a folding state, the processor (e.g., the processor 120) of the electronic device 100 may use the pre-stored function.

Figure 7:
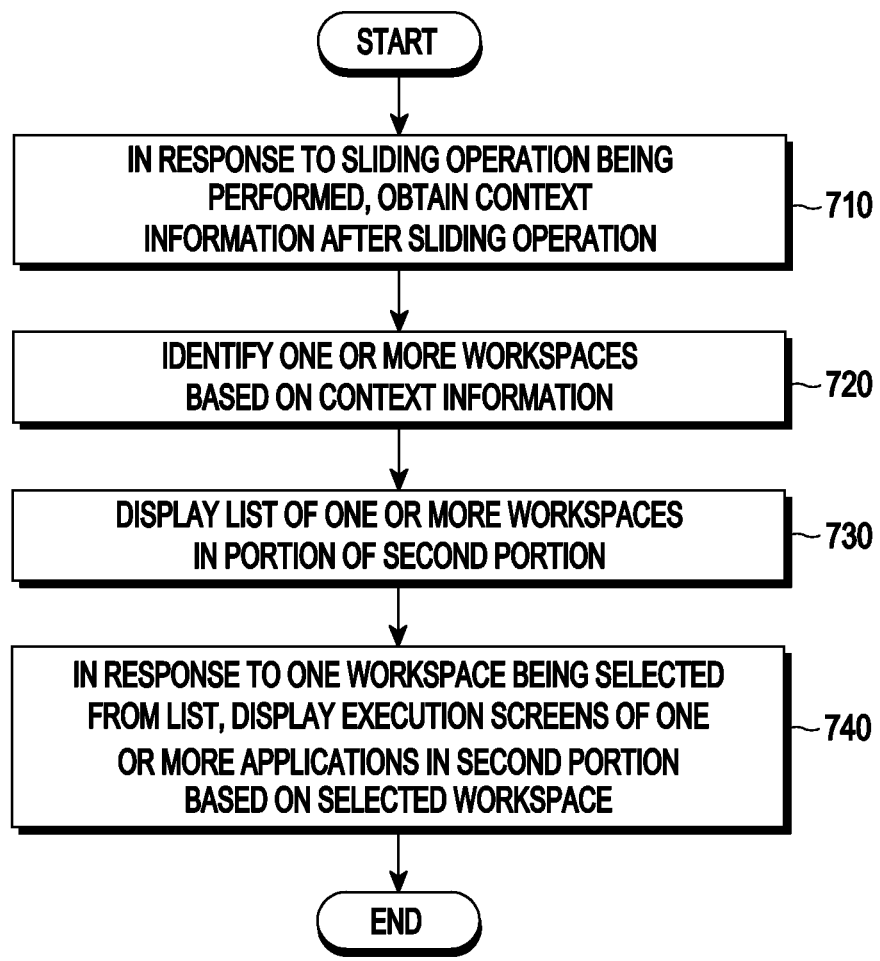
FIG. 7 is a flowchart illustrating an example operation of implementing a workspace based on context information of an electronic device according to various embodiments.

FIG. 7 is a flowchart illustrating an example operation of implementing a workspace based on context information of an electronic device according to various embodiments.

According to various embodiments, referring to FIG. 7, in operation 710, in response to a sliding operation being performed, an electronic device (e.g., the electronic device 100 in FIG. 1 or the processor 120 in FIG. 1) may obtain context information after the sliding operation.

For example, in the state in which a first portion of a flexible display (e.g., the display module 160 in FIG. 1) is exposed to the outside, if a sliding operation of exposing a second portion including at least a portion of the first portion of the flexible display to the outside is performed based on a user input, the electronic device may obtain context information in the state in which the second portion is exposed.

According to various embodiments, the user input for a sliding operation of the flexible display may be an input of a command for extension-sliding that increases the size of the exposed area of the flexible display or reduction-sliding that reduces the size of the exposed area of the flexible display.

According to various embodiments, if extension-sliding is performed on the flexible display, the exposed second portion of the flexible display may include the first portion.

According to various embodiments, if reduction-sliding is performed on the flexible display, the exposed second portion of the flexible display may be a portion of the first portion.

According to various embodiments, the flexible display may perform stepwise sliding operations. For example, extension-sliding or reduction-sliding may be performed on the flexible display in stages. The stepwise sliding operations of the flexible display according to various embodiments will be described in greater detail below with reference to FIG. 9.

According to various embodiments, the context information may include at least one of size information of the second portion of the flexible display, time information during a sliding operation, place information during a sliding operation, or a recent frequency of use of an application. For example, if the flexible display slides such that the second portion thereof is exposed, the electronic device may obtain size information of the second portion as context information. According to various embodiments, if the flexible display slides such that the second portion thereof is exposed, the electronic device may further obtain, as context information, at least one piece of information about the time or the place at which the sliding operation is performed. According to various embodiments, the electronic device may obtain, as context information, information about the frequency of use of an application that is used for at least one piece of the obtained time information and place information.

According to various embodiments, the context information may further include information about an application that is running during the sliding operation or an event occurring before receiving the user input. For example, if the flexible display slides such that the second portion thereof is exposed, the electronic device may further obtain, as context information, information about the application that is running before the sliding operation. As an embodiment, if the flexible display slides such that the second portion thereof is exposed, the electronic device may further include information about an event that occurred before the sliding operation. For example, if a user input for a sliding operation is received after an event of receiving a new message occurs, the electronic device may obtain information about the event of receiving a new message as the context information.

According to various embodiments, in operation 720, the electronic device may identify one or more workspaces, based on the context information.

According to various embodiments, the workspace may include at least one of at least one application execution screen provided by the electronic device or setting information of the electronic device.

For example, if one application is executed because the exposed area of the flexible display of the electronic device is small (e.g., single tasking), the workspace may include information about the size of the exposed area of the flexible display and information about the executed application.

According to various embodiments, if a plurality of applications is executed because the exposed area of the flexible display is large (e.g., multi-tasking), the workspace may include information about the size of the exposed area of the flexible display, information about the plurality of executed applications, and information about the layout of execution screens of the plurality of applications.

According to various embodiments, information about the size of the exposed area of the flexible display may include the ratio of the horizontal length to the vertical length of the exposed area, or information about the length of the exposed area of the flexible display that varies according to a sliding operation.

According to various embodiments, the setting information of the electronic device, which is included in the workspace, may include at least one piece of network setting information, volume setting information, or notification setting information.

According to various embodiments, the workspace may further include a workspace of an external electronic device, which is received from the external electronic device through a communication module (e.g., the communication module 190 in FIG. 1). According to various embodiments, the content related to the workspace of the external electronic device received from the external electronic device will be described in greater detail below with reference to FIGS. 11 and 12.

According to various embodiments, the workspace may be specified by a user. According to various embodiments, a workspace specified by a user may have priority over other workspaces.

According to various embodiments, at least one workspace specified by a user may be a workspace in the extended state of the flexible display, which is stored in a memory (e.g., the memory 130 in FIG. 1) based on receiving a user input for reducing the flexible display to a minimum size in the extended state thereof. According to various embodiments, if a user input for permanently storing a currently used workspace as a user-specified workspace is configured as a user input other than a user input for reducing the flexible display to a minimum size, the electronic device may permanently store a currently used workspace as a user-specified workspace when the configured user input is received.

According to various embodiments, at least one workspace specified by a user may, if a user input for reducing the flexible display is received in the extended state thereof, store a workspace in the extended state in the memory, and, if the flexible display is reduced and then changed into the extended state, display the execution screens of one or more applications, based on the workspace in the extended state, which is stored in the memory.

For example, if a user input is a user input for simply reducing the size of the flexible display, instead of a user input for permanently storing a currently used workspace as a user-specified workspace, the electronic device may temporarily store a current workspace and, if the flexible display is reduced and then changed into the extended state, display execution screens of one or more applications, based on the temporarily stored workspace.

For example, if a call signal is received in the extended state so that the flexible display is reduced for a call, the electronic device may temporarily store the workspace before reducing the flexible display and, if the flexible display is extended again after termination of the call, display execution screens of one or more applications, based on the temporarily stored workspace.

According to various embodiments, an operation of specifying a workspace by a user will be described in greater detail below with reference to FIGS. 18 and 19.

According to various embodiments, in operation 730, the electronic device may display a list of workspaces in a portion of the second portion. For example, after the sliding operation of the flexible display is completed, the electronic device may display, in a portion of the second portion, a list including one or more workspaces corresponding to the size of the area exposed after sliding.

According to various embodiments, the list may include one or more thumbnails respectively corresponding to one or more workspaces.

According to various embodiments, each of the thumbnails in the list may include images related to execution screens of one or more applications or images related to icons of one or more applications. According to various embodiments, if the workspace is obtained from an external electronic device, at least one of the one or more thumbnails may further include information about the external electronic device from which the workspace is obtained.

According to various embodiments, the list including one or more workspaces may be displayed such that a workspace specified by a user has priority over other workspaces.

The list of one or more workspaces according to various embodiments will be described in greater detail below with reference to FIGS. 11 and 12 below.

According to various embodiments, in operation 740, in response to one workspace being selected from the list, the electronic device may display execution screens of one or more applications in the second portion, based on the selected workspace.

According to various embodiments, the electronic device may execute one or more applications, based on the selected workspace, and display execution screens of one or more applications to be arranged based on the layout included in the selected workspace.

According to various embodiments, if setting information of the electronic device is included in the selected workspace, the electronic device may configure at least one of network setting, volume setting, and notification setting of the electronic device, based on the setting information.

Figure 8:
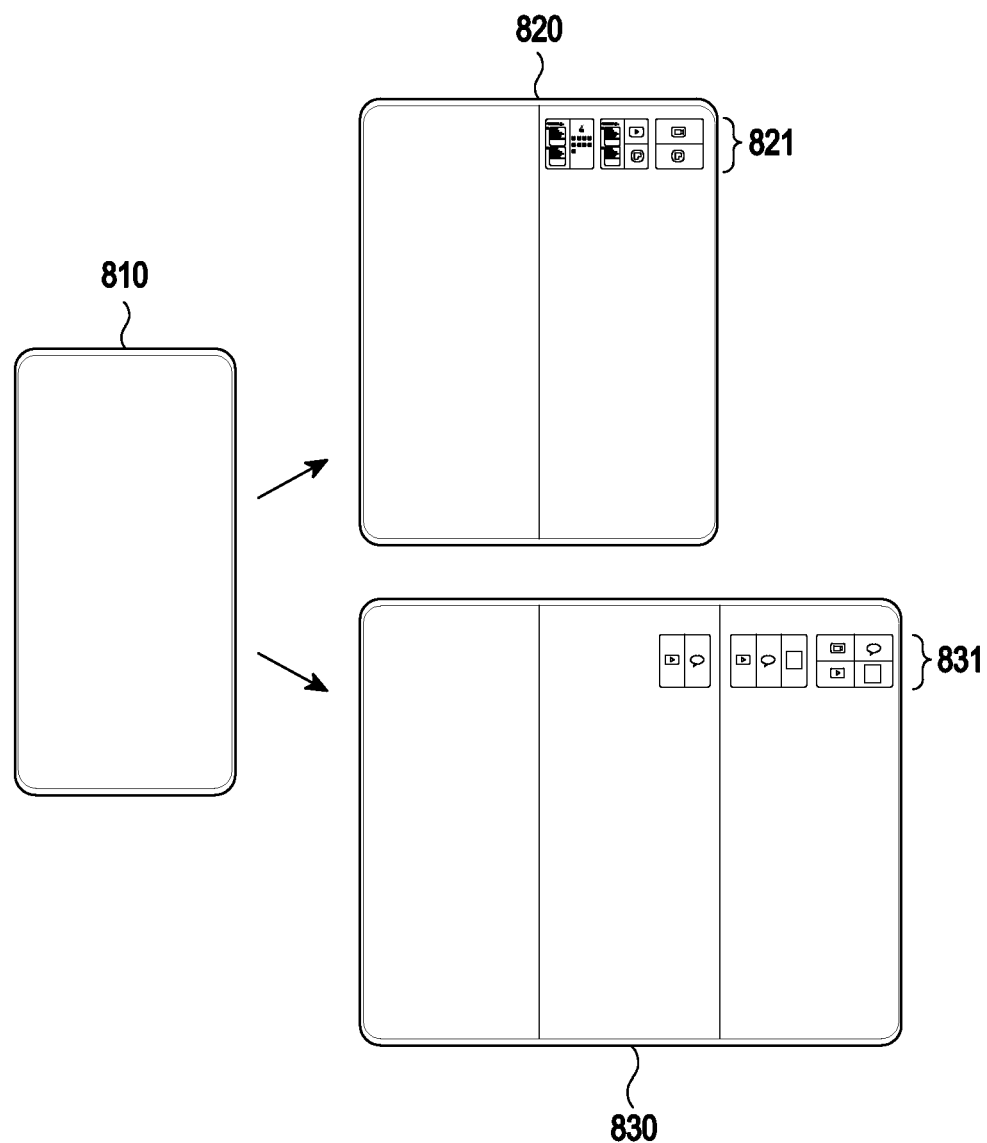
FIG. 8 is a diagram illustrating a sliding operation of an electronic device and an operation of displaying a workspace list corresponding to an exposed (e.g., visible) area according to various embodiments.

FIG. 8 is a diagram illustrating an operation of displaying a workspace list corresponding to a sliding operation of an electronic device and an exposed area according to various embodiments.

According to various embodiments, referring to FIG. 8, if the size of a flexible display (e.g., the display module 160 in FIG. 1) is extended from a minimum state 810 to an intermediate state 820, the electronic device (e.g., the electronic device 100 in FIG. 1 or the processor 120 in FIG. 1) may display a list 821 including one or more workspaces corresponding to the intermediate state 820.

According to various embodiments, if the size of the flexible display is extended from the minimum state 810 to a maximum state 830, the electronic device may display a list 831 including one or more workspaces corresponding to the maximum state 830.

Although an embodiment in which the size of the flexible display is extended from the minimum state 810 to the intermediate state 820 or to the maximum state 830 is illustrated in FIG. 8, the disclosure is not limited thereto, and even if the size of the flexible display is extended from the intermediate state 820 to the maximum state 830, the electronic device may display the list 831 corresponding to the maximum state 830.

According to various embodiments, if the size of the flexible display is reduced from the maximum state 830 to the intermediate state 820, the electronic device may also display the list 821 corresponding to the intermediate state 820.

Although only the case in which the flexible display is extended or reduced through a sliding operation has been illustrated in FIG. 8, according to various embodiments, even in the case where the size of an active area of the display is changed through a folding operation as shown in FIGS. 5 and 6, a list including one or more workspaces corresponding to the size of the active area may be displayed in a portion of the active area as shown in FIG. 8.

Figure 9:
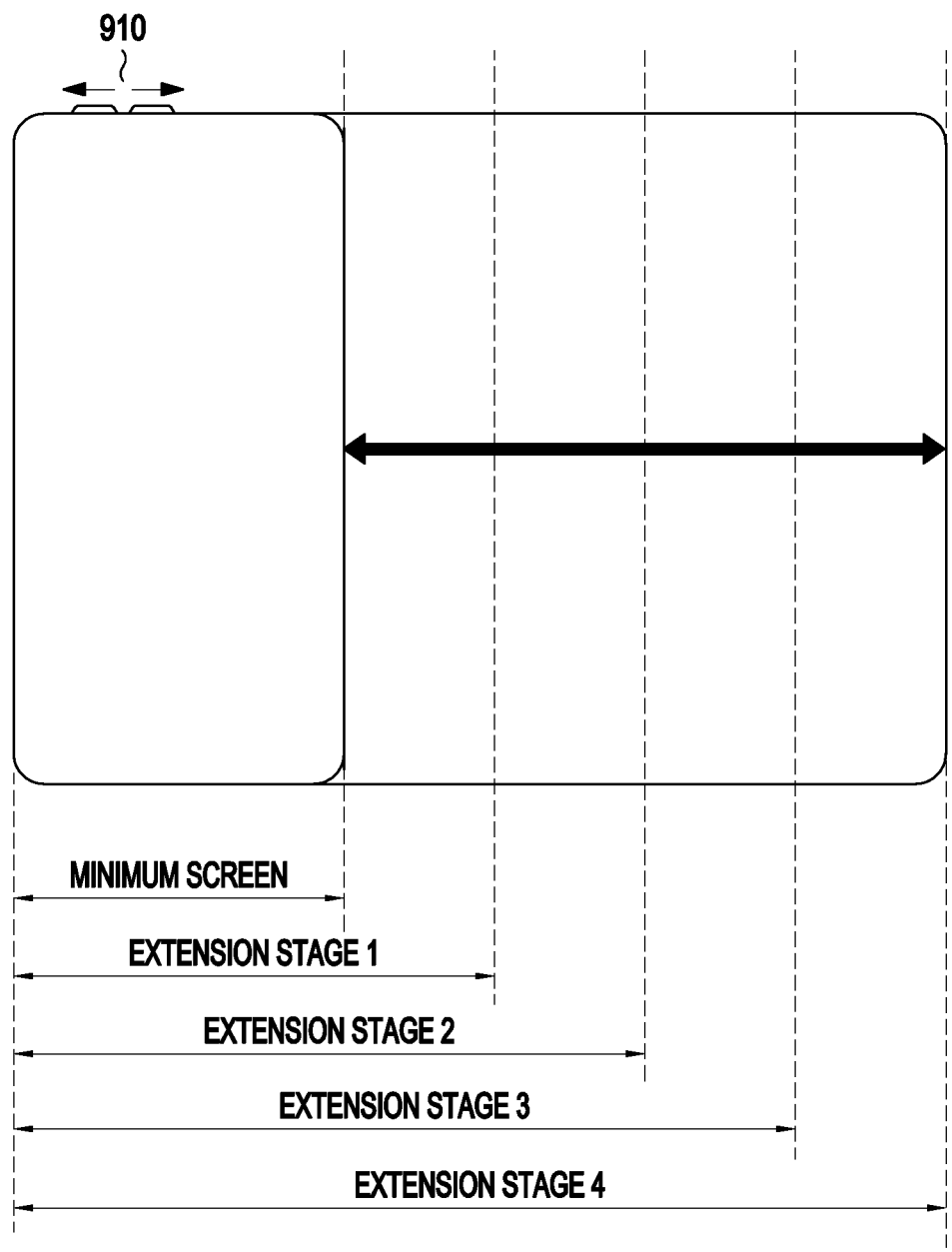
FIG. 9 is a diagram illustrating example stepwise extension or reduction stages of an electronic device according to various embodiments.

FIG. 9 is a diagram illustrating stepwise extension or reduction stages of an electronic device according to various embodiments.

According to various embodiments, referring to FIG. 9, a flexible display (e.g., the display module 160 in FIG. 1) may be extended or reduced in several stages.

According to various embodiments, if a user input for extension-sliding or reduction-sliding of the flexible display is received, an electronic device (e.g., the electronic device 100 in FIG. 1 or the processor 120 in FIG. 1) may perform extension-sliding or reduction-sliding of the flexible display. For example, if a user input of pressing a button 910 is received, the electronic device may perform extension-sliding or reduction-sliding of the flexible display. According to various embodiments, the extension-sliding or reduction-sliding of the flexible display may be completed by pressing the button 910 one more time during the extension-sliding or reduction-sliding of the flexible display by pressing the button 910.

For example, if a user input of pressing the button 910 for extension-sliding is received while the flexible display has a minimum-sized screen, the electronic device may perform extension-sliding of the flexible display to, for example, extension stage 1, and if a user input of pressing the button 910 is received when the size of the flexible display is in between extension stage 2 and extension stage 3, the electronic device may complete the extension-sliding operation when the size of the flexible display reaches extension stage 3.

According to various embodiments, if a user input of pressing the button 910 is received when the size of the flexible display is in between extension stage 2 and extension stage 3, the electronic device may adjust the size of the flexible display to one of extension stage 2 and extension stage 3, which has a small difference in the size of the flexible display from that when the user input is received, and complete the sliding operation. For example, if the extension stage having a small difference in the size of the flexible display from that when receiving the user input is extension stage 2 among the extension stage 2 and the extension stage 3, the electronic device may terminate extension-sliding of the flexible display, perform reduction-sliding such that the size of the flexible display reaches extension stage 2, and then complete the sliding operation.

According to various embodiments, if the button 910 is long-pressed, the electronic device may perform extension-sliding on the flexible display to have a maximum size (e.g., extension stage 4) or reduction-sliding on the flexible display to have a minimum size.

According to various embodiments, although only the sliding operation using the button 910 is illustrated in FIG. 9 according to various embodiments, the disclosure is not limited thereto, and even if a user input for the sliding operation is a drag input or a voice input, staged extension-sliding or reduction-sliding operations may be applied thereto.

Figure 10:
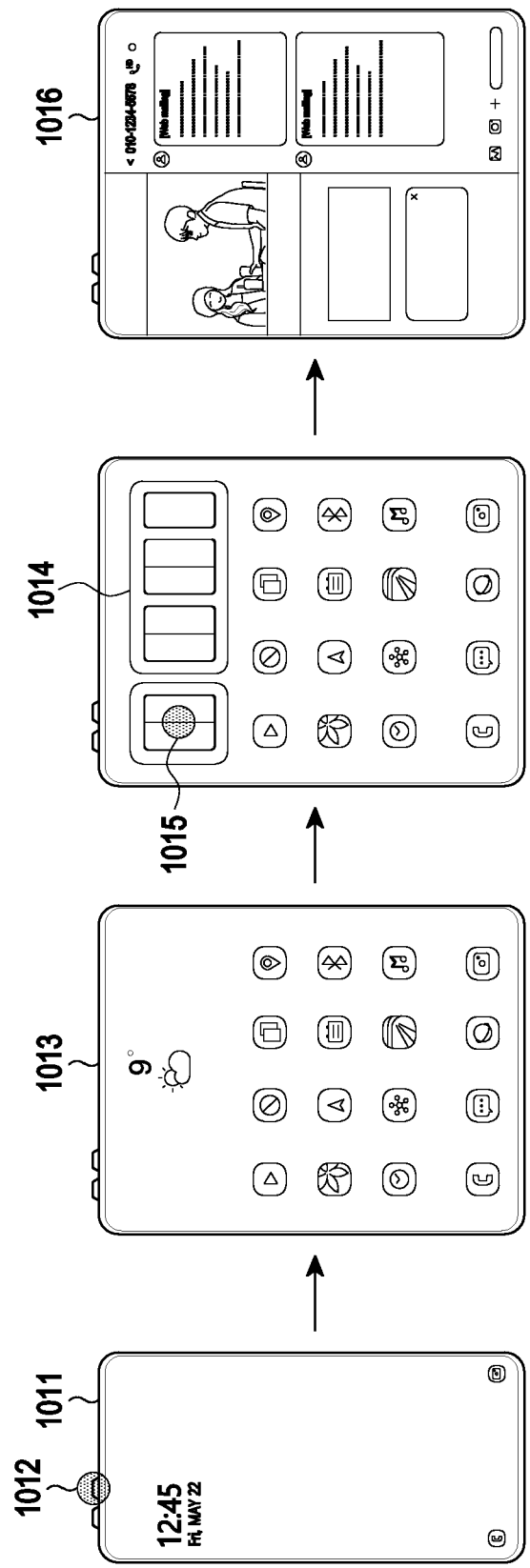
FIG. 10 is a diagram illustrating an example operation of implementing a workspace of an electronic device according to various embodiments.

FIG. 10 is a diagram illustrating an example operation of implementing a workspace of an electronic device according to various embodiments.

According to various embodiments, referring to FIG. 10, if a user input for sliding a flexible display (e.g., the display module 160 in FIG. 1) is received in the state in which a first portion 1011 of the flexible display is exposed, an electronic device (e.g., the electronic device 100 in FIG. 1 or the processor 120 in FIG. 1) may perform sliding such that a second portion 1013 of the flexible display is exposed.

For example, if a user input of pressing a button 1012 for extending the flexible display is received in the state in which the exposed first portion 1011 of the flexible display is in the minimum state, the electronic device may slide the flexible display to be extended.

According to various embodiments, if a user presses the button 1012 again while the second portion 1013 of the flexible display is exposed, or if the exposed second portion 1013 of the flexible display reaches the maximum state, the electronic device may end the sliding operation.

According to various embodiments, the electronic device may display a list 1014 including one or more workspaces corresponding to the second portion 1013. According to various embodiments, the electronic device may obtain context information (e.g., at least one piece of time information, place information, information about a running application, or event occurrence information before user input) at the time at which a user input of pressing the button 1012 for extension-sliding is received, obtain context information (e.g., size information of the flexible display) after the extension-sliding operation, and display a list 1014 including one or more workspaces identified based on the obtained context information in a portion of the second portion 1013 of the flexible display.

Figure 11:
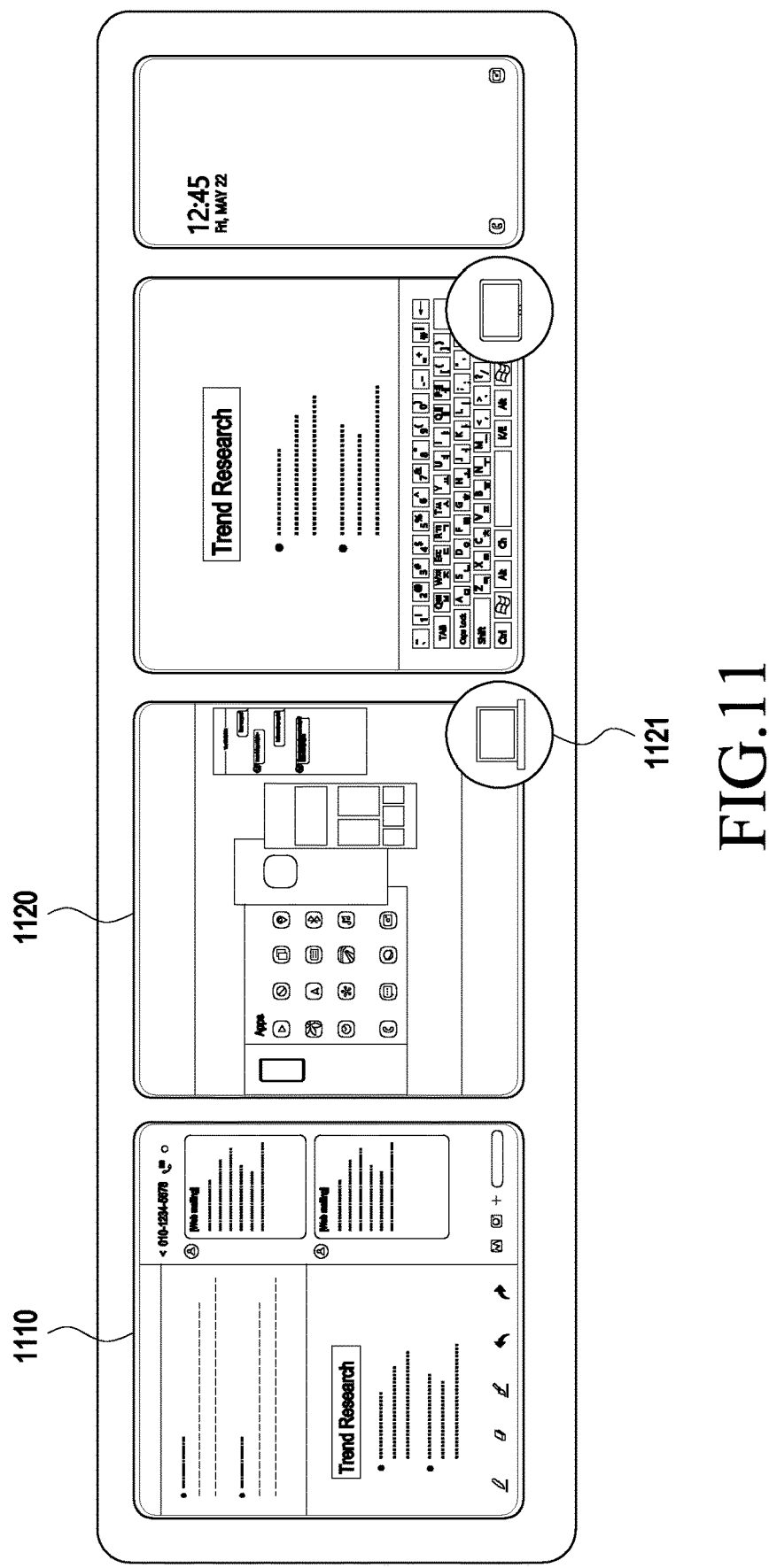
FIG. 11 is a diagram illustrating a workspace list according to various embodiments.
Figure 12:
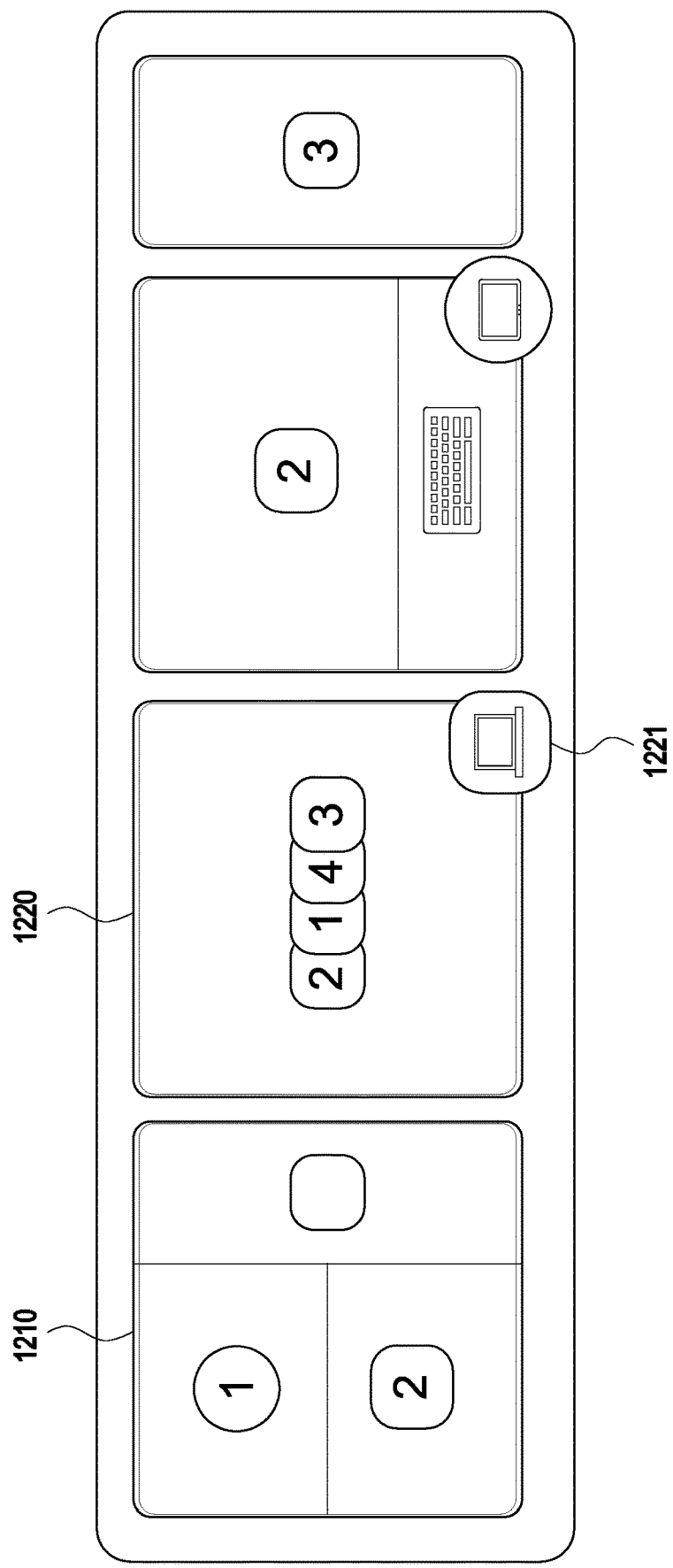
FIG. 12 is a diagram illustrating a workspace list according to various embodiments.

According to various embodiments, the list 1014 including one or more workspaces may include images related to execution screens of one or more applications (e.g., see FIG. 11) or images related to icons of one or more applications (e.g., see FIG. 12).

According to various embodiments, if one workspace 1015 is selected from the list 1014 including one or more workspaces, the electronic device may display execution screens 1016 of one or more applications corresponding to the selected workspace 1015. For example, the electronic device may execute one or more applications corresponding to the selected workspace and display execution screens 1016 of one or more applications arranged based on layout information included in the selected workspace.

Although only the case in which the flexible display is extended or reduced through a sliding operation has been illustrated and described in FIG. 10, according to various embodiments, in the case where the size of an active area of the display is changed through a folding operation as shown in FIGS. 5 and 6, a list including one or more workspaces corresponding to the size of the active area may be displayed in a portion of the active area as shown in FIG. 10.

FIG. 11 is a diagram illustrating an example workspace list according to various embodiments.

According to various embodiments, referring to FIG. 11, a list including one or more workspaces may include one or more thumbnails 1110 and 1120 corresponding to one or more workspaces, respectively. According to various embodiments, one or more thumbnails included in the list may include images related to execution screens of one or more applications.

For example, a first execution screen image 1110 and a second execution screen image 1120 may include images of execution screens of one or more applications disposed based on a workspace.

According to various embodiments, a workspace may be received from an external electronic device, and the second execution screen image 1120 corresponding to the workspace received from the external electronic device may further display information 1121 on the external electronic device from which the workspace is obtained. For example, the information 1121 on the external electronic device may include an image of the external electronic device (e.g., a DeX device or a tablet PC).

According to various embodiments, a list including one or more workspaces may display execution screen images of a workspace specified by a user prior to the execution screen images of other workspaces by giving priority thereto.

Although it has been illustrated in FIG. 11 that the list includes only the execution screen images, according to various embodiments, the execution screen images and the icon images may be displayed together.

FIG. 12 is a diagram illustrating an example workspace list according to various embodiments.

According to various embodiments, referring to FIG. 12, a list including one or more workspaces may include one or more thumbnails 1210 and 1220 corresponding to one or more workspaces, respectively. According to various embodiments, one or more thumbnails included in the list may include images related to icons of one or more applications.

For example, a first icon image 1210 and a second icon image 1220 may include images of icons of one or more applications disposed based on a workspace.

According to various embodiments, a workspace may be received from an external electronic device, and the second icon image 1220 corresponding to the workspace received from the external electronic device may further display information 1221 about the external electronic device from which the workspace is obtained. For example, the information 1121 on the external electronic device may include an image of the external electronic device (e.g., a DeX device or a tablet PC).

According to various embodiments, a list including one or more workspaces may display icon images of a workspace specified by a user prior to the icon images of other workspaces by giving priority thereto.

Although it has been illustrated in FIG. 12 that the list includes only the icon images, according to various embodiments, the execution screen images and the icon images may be displayed together.

Figure 13:
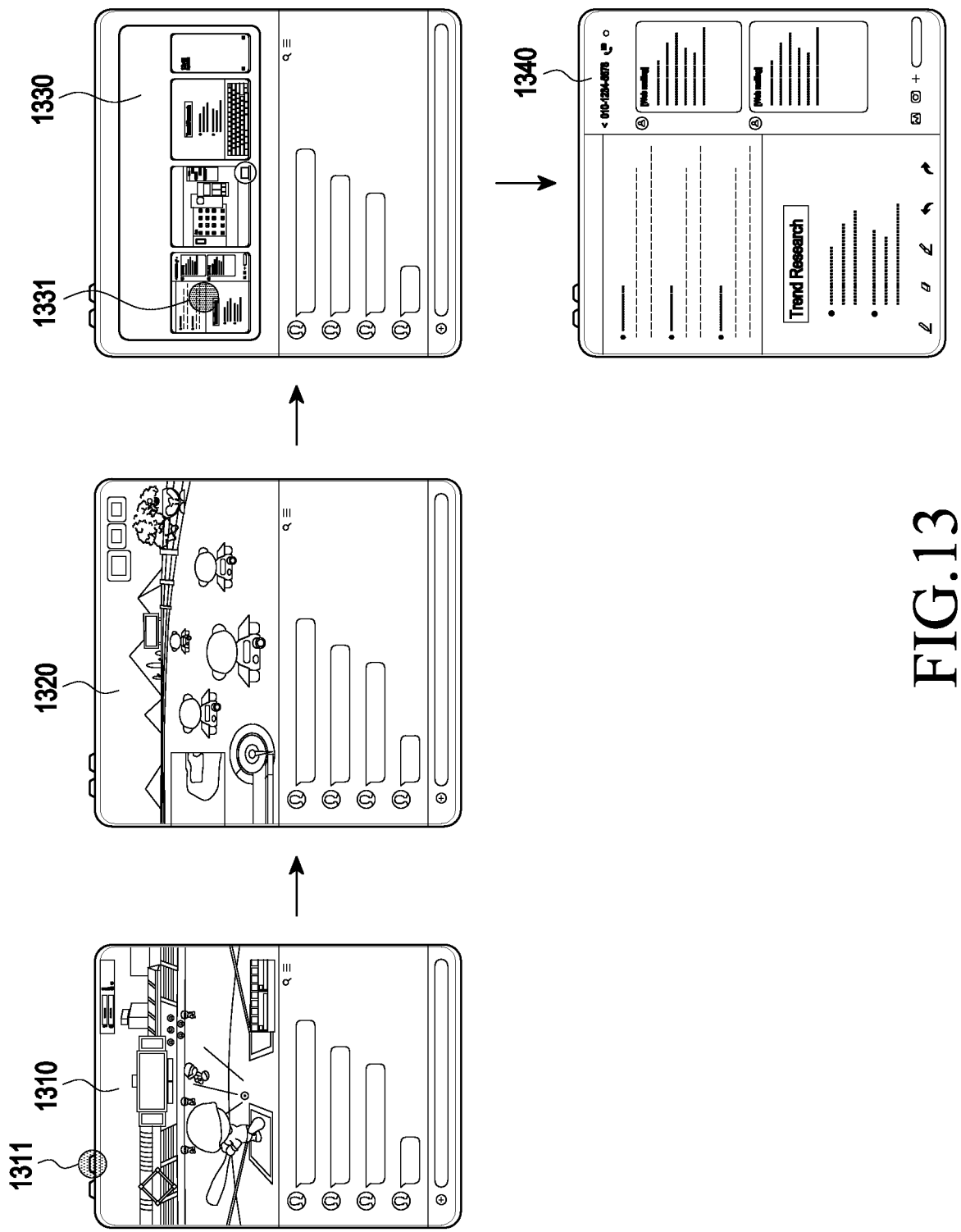
FIG. 13 is a diagram illustrating an example operation of implementing a workspace of an electronic device according to various embodiments.

FIG. 13 is a diagram illustrating an example operation of implementing a workspace of an electronic device according to various embodiments.

According to various embodiments, referring to FIG. 13, if a user input for sliding a flexible display (e.g., the display module 160 in FIG. 1) is received in the state in which a first portion 1310 of the flexible display is exposed, an electronic device (e.g., the electronic device 100 in FIG. 1 or the processor 120 in FIG. 1) may perform sliding such that a second portion 1320 of the flexible display is exposed.

For example, if a user input of pressing a button 1311 for extending the flexible display is received in the state in which the exposed first portion 1310 of the flexible display is in a specific extended state, the electronic device may slide the flexible display to be extended.

According to various embodiments, if a user presses the button 1311 again while the second portion 1320 of the flexible display is exposed, or if the exposed second portion 1320 of the flexible display reaches the maximum state, the electronic device may end the sliding operation.

According to various embodiments, the electronic device may display a list 1330 including one or more workspaces corresponding to the second portion 1320. According to various embodiments, the electronic device may obtain context information (e.g., at least one piece of time information, place information, information about a running application, or event occurrence information before user input) at the time at which a user input of pressing the button 1311 for extension-sliding is received, obtain context information (e.g., size information of the flexible display) after the extension-sliding operation, and display the list 1330 including one or more workspaces identified based on the obtained context information in a portion of the second portion 1320 of the flexible display.

According to various embodiments, the list 1330 including one or more workspaces may include images related to execution screens of one or more applications as shown in FIG. 11 or images related to icons of one or more applications as shown in FIG. 12.

According to various embodiments, the list 1330 including one or more workspaces may preferentially display a user-specified workspace. According to various embodiments, the list 1330 including one or more workspaces may further include at least one workspace temporarily stored as reduction-sliding is performed while the second portion 1320 of the flexible display is exposed. According to various embodiments, at least one temporarily stored workspace may be preferentially displayed over other workspaces but with a lower priority than a user-specified workspace.

According to various embodiments, if one workspace 1331 is selected from the list 1330 including one or more workspaces, the electronic device may display execution screens 1340 of one or more applications corresponding to the selected workspace 1331. For example, the electronic device may execute one or more applications corresponding to the selected workspace and display execution screens 1340 of one or more applications arranged based on layout information included in the selected workspace.

Although only the case in which the flexible display is extended or reduced through a sliding operation has been illustrated and described in FIG. 13, according to various embodiments, in the case where the size of an active area of the display is changed through a folding operation as shown in FIGS. 5 and 6, a list including one or more workspaces corresponding to the size of the active area may be displayed in a portion of the active area as shown in FIG. 13.

Figure 14:
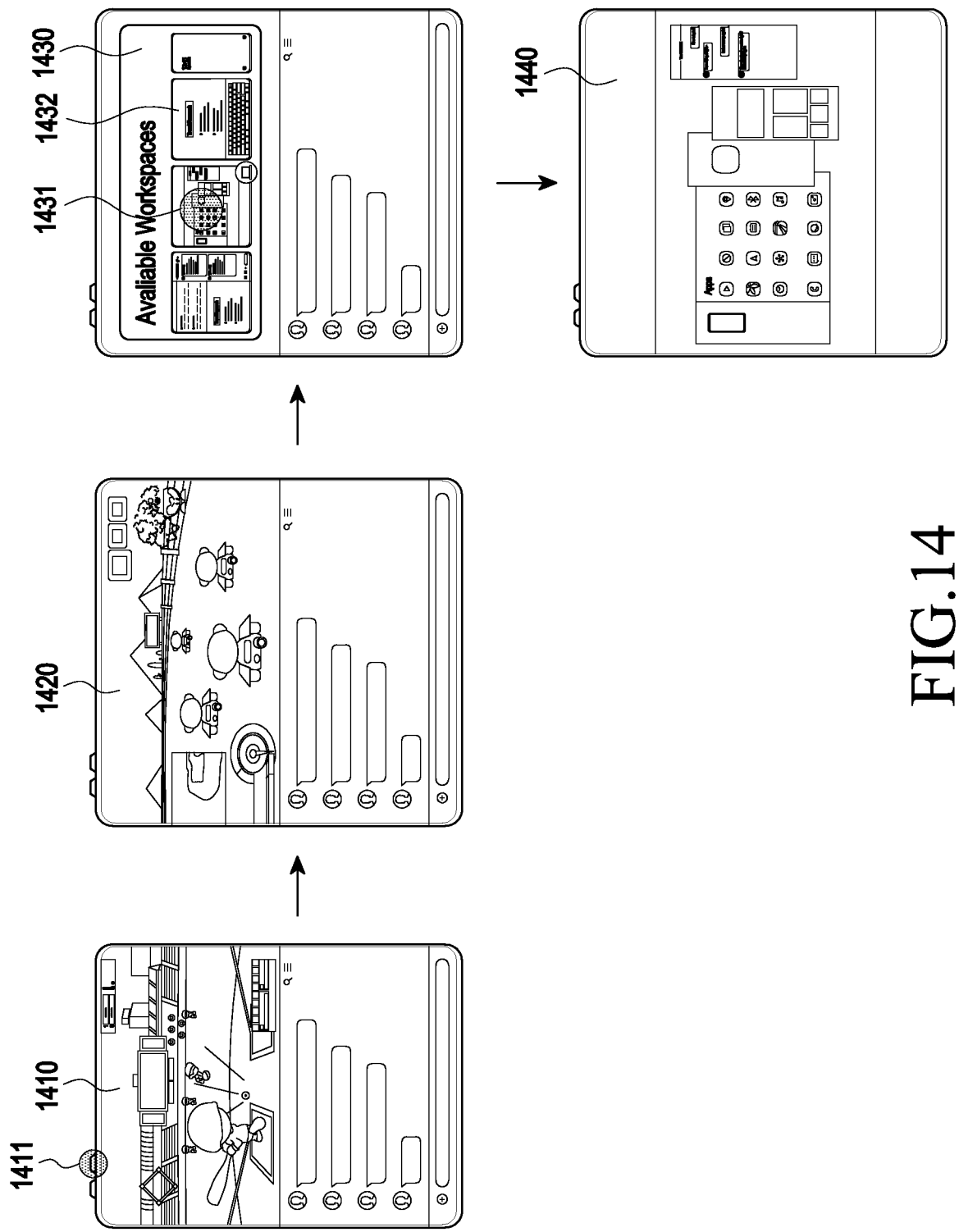
FIG. 14 is a diagram illustrating an example operation of implementing a workspace of an electronic device according to various embodiments.

FIG. 14 is a diagram illustrating an example operation of implementing a workspace of an electronic device according to various embodiments.

According to various embodiments, referring to FIG. 14, if a user input for sliding a flexible display (e.g., the display module 160 in FIG. 1) is received in the state in which a first portion 1410 of the flexible display is exposed, an electronic device (e.g., the electronic device 100 in FIG. 1 or the processor 120 in FIG. 1) may perform sliding such that a second portion 1420 of the flexible display is exposed.

For example, if a user input of pressing a button 1411 for extending the flexible display is received in the state in which the exposed first portion 1410 of the flexible display is in a specific extended state, the electronic device may slide the flexible display to be extended.

According to various embodiments, if a user presses the button 1411 again while the second portion 1420 of the flexible display is exposed, or if the exposed second portion 1420 of the flexible display reaches the maximum state, the electronic device may end the sliding operation.

According to various embodiments, the electronic device may display a list 1430 including one or more workspaces corresponding to the second portion 1420. According to various embodiments, the electronic device may obtain context information (e.g., at least one piece of time information, place information, information about a running application, or event occurrence information before user input) at the time at which a user input of pressing the button 1411 for extension-sliding is received, obtain context information (e.g., size information of the flexible display) after the extension-sliding operation, and display the list 1430 including one or more workspaces identified based on the obtained context information in a portion of the second portion 1420 of the flexible display.

According to various embodiments, the list 1430 including one or more workspaces may include images related to execution screens of one or more applications as shown in FIG. 11 or images related to icons of one or more applications as shown in FIG. 12.

According to various embodiments, the list 1430 including one or more workspaces may preferentially display a user-specified workspace. According to various embodiments, the list 1430 including one or more workspaces may further include at least one workspace temporarily stored as reduction-sliding is performed while the second portion 1420 of the flexible display is exposed. According to various embodiments, at least one temporarily stored workspace may be preferentially displayed over other workspaces but with a lower priority than a user-specified workspace.

According to various embodiments, the list 1430 including one or more workspaces may include a workspace 1431 received from an external electronic device. According to various embodiments, in the case where the workspace is received from an external electronic device, the list 1430 including one or more workspaces may include information 1432 on the external electronic device. For example, the information 1432 on the external electronic device may include an image of the external electronic device (e.g., a DeX device or a tablet PC).

According to various embodiments, if one workspace 1431 is selected from the list 1430 including one or more workspaces, the electronic device may display execution screens 1440 of one or more applications corresponding to the selected workspace 1431. For example, the electronic device may execute one or more applications corresponding to the selected workspace and display execution screens 1440 of one or more applications arranged based on layout information included in the selected workspace.

Although only the case in which the flexible display is extended or reduced through a sliding operation has been illustrated and described in FIG. 14, according to various embodiments, in the case where the size of an active area of the display is changed through a folding operation as shown in FIGS. 5 and 6, a list including one or more workspaces corresponding to the size of the active area may be displayed in a portion of the active area as shown in FIG. 14.

Figure 15:
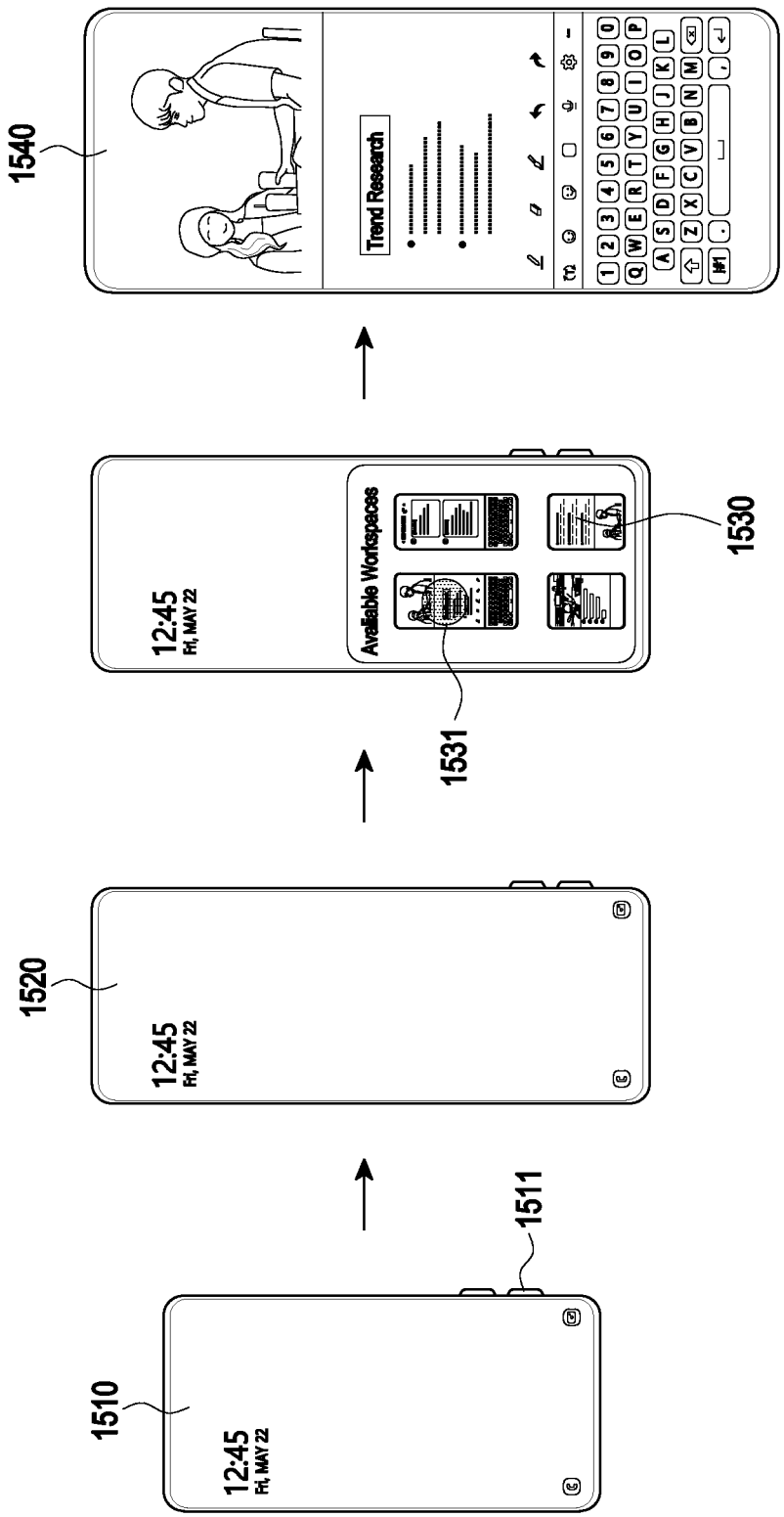
FIG. 15 is a diagram illustrating an example operation of implementing a workspace of an electronic device according to various embodiments.

FIG. 15 is a diagram illustrating an example operation of implementing a workspace of an electronic device according to various embodiments. For example, FIG. 15 shows an embodiment in which a flexible display (e.g., the display module 160 in FIG. 1) performs a sliding operation in a vertical direction.

According to various embodiments, referring to FIG. 15, if a user input for sliding a flexible display (e.g., the display module 160 in FIG. 1) is received in the state in which a first portion 1510 of the flexible display is exposed, an electronic device (e.g., the electronic device 100 in FIG. 1 or the processor 120 in FIG. 1) may perform sliding such that a second portion 1520 of the flexible display is exposed.

For example, if a user input of pressing a button 1511 for extending the flexible display is received in the state in which the exposed first portion 1510 of the flexible display is in the minimum state, the electronic device may slide the flexible display to be extended.

According to various embodiments, if a user presses the button 1511 again while the second portion 1520 of the flexible display is exposed, or if the exposed second portion 1520 of the flexible display reaches the maximum state, the electronic device may end the sliding operation.

According to various embodiments, the electronic device may display a list 1530 including one or more workspaces corresponding to the second portion 1520. According to various embodiments, the electronic device may obtain context information (e.g., at least one piece of time information, place information, information about a running application, or event occurrence information before user input) at the time at which a user input of pressing the button 1511 for extension-sliding is received, obtain context information (e.g., size information of the flexible display) after the extension-sliding operation, and display the list 1530 including one or more workspaces identified based on the obtained context information in a portion of the second portion 1520 of the flexible display.

According to various embodiments, the list 1530 including one or more workspaces may include images related to execution screens of one or more applications or images related to icons of one or more applications.

According to various embodiments, if one workspace 1531 is selected from the list 1530 including one or more workspaces, the electronic device may display execution screens 1540 of one or more applications corresponding to the selected workspace 1531. For example, the electronic device may execute one or more applications corresponding to the selected workspace and display execution screens 1540 of one or more applications arranged based on layout information included in the selected workspace.

Although only the case in which the flexible display is extended or reduced through a sliding operation has been illustrated and described in FIG. 15, according to various embodiments, in the case where the size of an active area of the display is changed through a folding operation as shown in FIGS. 5 and 6, a list including one or more workspaces corresponding to the size of the active area may be displayed in a portion of the active area as shown in FIG. 15.

Figure 16:
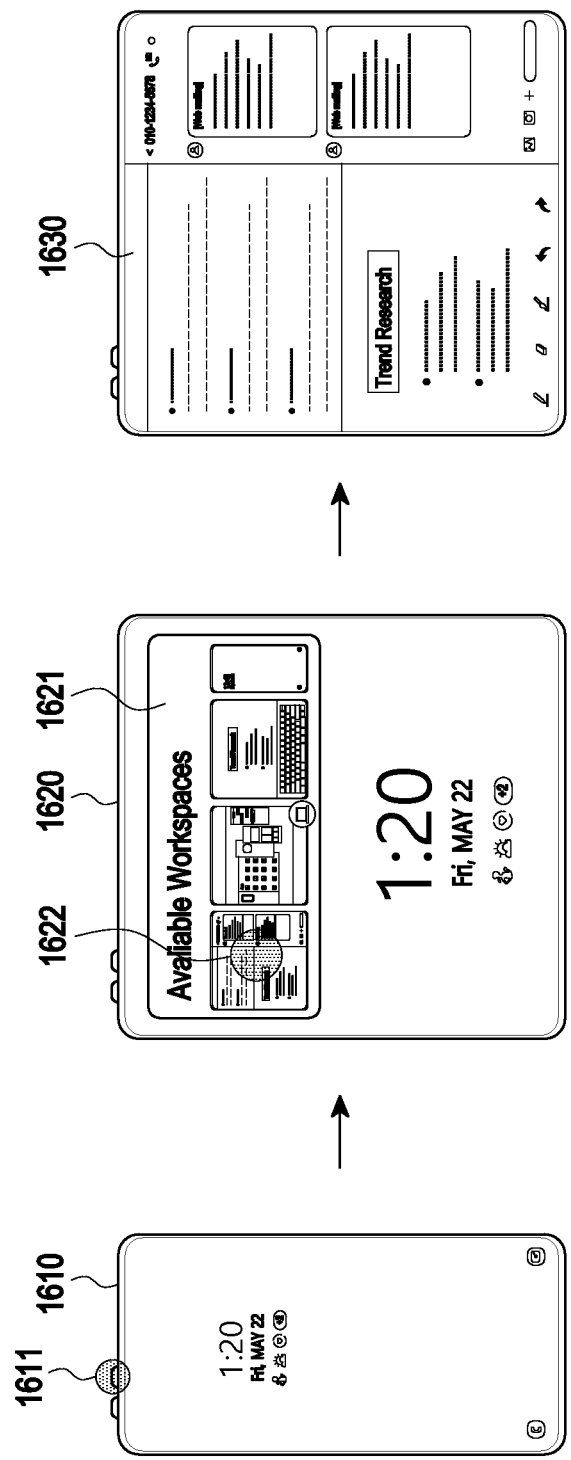
FIG. 16 is a diagram illustrating an example operation of implementing a workspace of an electronic device according to various embodiments.

FIG. 16 is a diagram illustrating an example operation of implementing a workspace of an electronic device according to various embodiments.

According to various embodiments, referring to FIG. 16, if a user input for sliding a flexible display (e.g., the display module 160 in FIG. 1) is received in the state in which a first portion 1610 of the flexible display is exposed, an electronic device (e.g., the electronic device 100 in FIG. 1 or the processor 120 in FIG. 1) may perform sliding such that a second portion 1620 of the flexible display is exposed.

For example, if a user input of pressing a button 1611 for extending the flexible display is received in the state in which the exposed first portion 1610 of the flexible display is in the minimum state or in a specific extended state, the electronic device may slide the flexible display to be extended.

According to various embodiments, if a user presses the button 1611 again while the second portion 1620 of the flexible display is exposed, or if the exposed second portion 1620 of the flexible display reaches the maximum state, the electronic device may end the sliding operation.

According to various embodiments, the electronic device may display a list 1621 including one or more workspaces. According to various embodiments, the list 1621 including one or more workspaces may include one or more images respectively corresponding to workspaces that may be implemented in various extended states of the flexible display.

Figure 17:
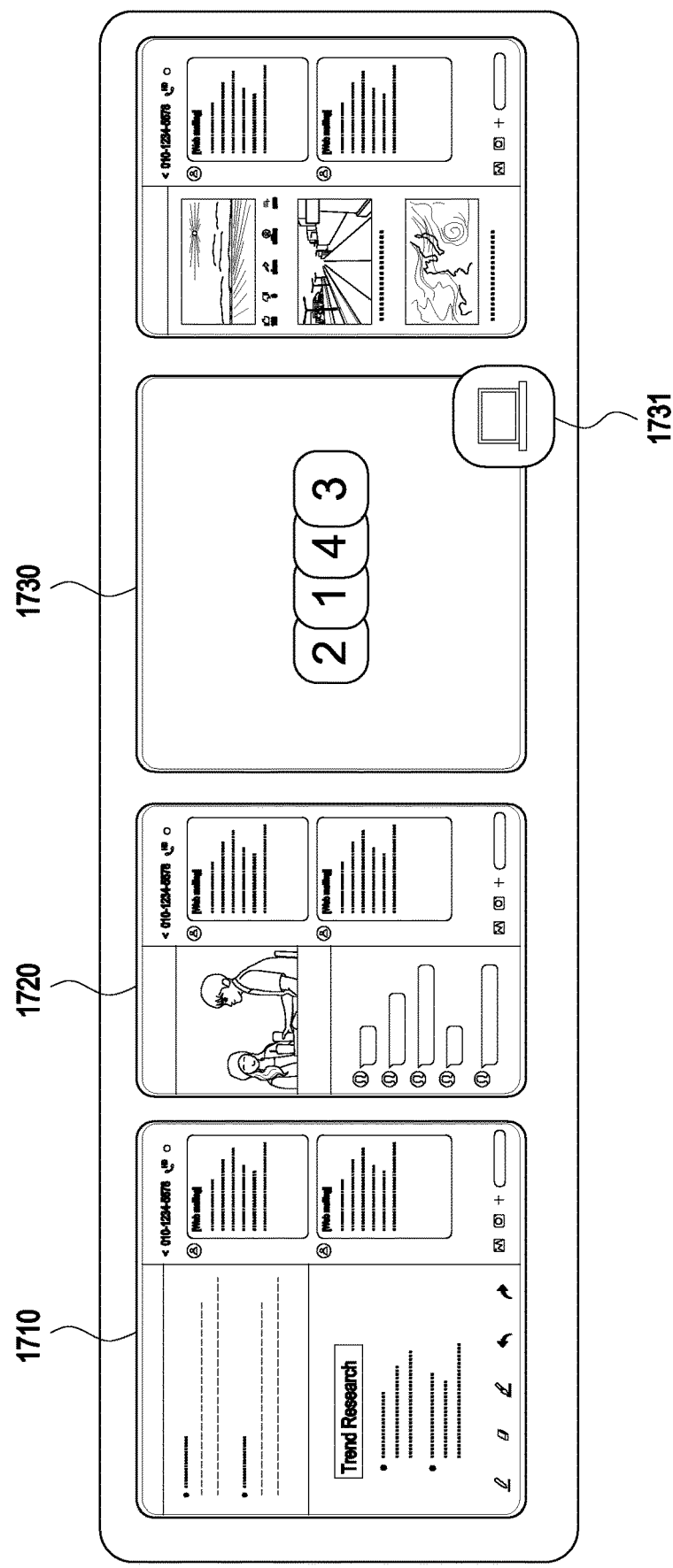
FIG. 17 is a diagram illustrating a workspace list according to various embodiments.

According to various embodiments, the electronic device may obtain context information (e.g., at least one piece of time information, place information, information about a running application, or event occurrence information before user input) at the time at which a user input of pressing the button 1611 for extension-sliding is received, and identify workspaces that may be implemented in various extended states of the flexible display, based on the obtained context information. For example, as shown in FIG. 17, the list 1621 including one or more workspaces may include the workspace 1720 in extension stage 2 (e.g., see FIG. 9) and the workspaces 1710 and 1730 in extension stage 3 (see FIG. 9). According to various embodiments, the list 1621 including one or more workspaces may include three or more extension stages.

FIG. 17 is a diagram illustrating an example workspace list according to various embodiments.

According to various embodiments, the list 1621 including one or more workspaces may include images 1710 and 1720 related to execution screens of one or more applications or images 1730 related to icons of one or more applications. According to various embodiments, if a workspace is received from an external electronic device, the images of the workspace may further display information 1731 on the external electronic device.

According to various embodiments, referring back to FIG. 16, if one workspace 1622 is selected from the list 1621 including one or more workspaces, the electronic device may display execution screens 1630 of one or more applications corresponding to the selected workspace 1622. For example, the electronic device may execute one or more applications corresponding to the selected workspace and display execution screens 1630 of one or more applications arranged based on layout information included in the selected workspace.

Although only the case in which the flexible display is extended or reduced through a sliding operation has been illustrated and described in FIG. 16, according to various embodiments, in the case where the size of an active area of the display is changed through a folding operation as shown in FIGS. 5 and 6, a list including one or more workspaces respectively corresponding to the sizes of several active areas may be displayed in a portion of the active area as shown in FIG. 16.

Figure 18:
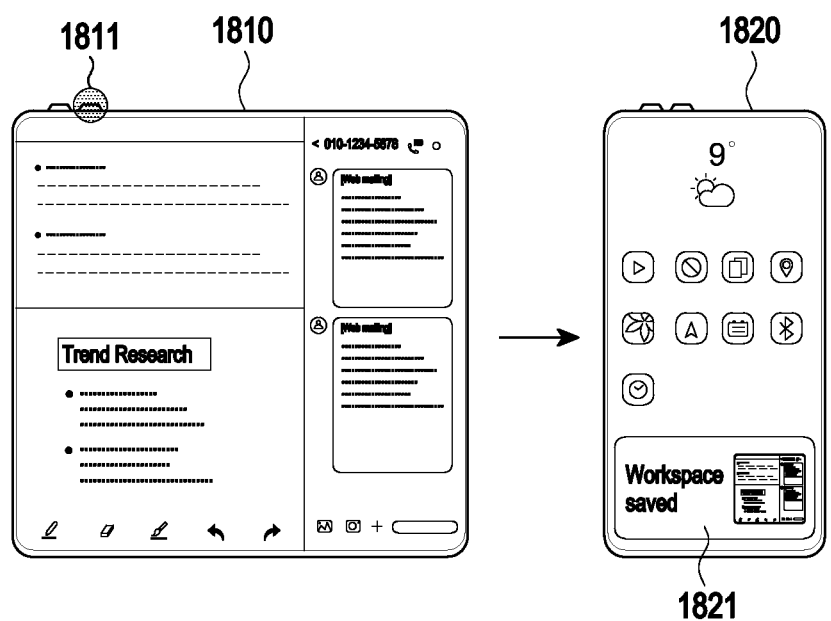
FIG. 18 is a diagram illustrating an example operation of obtaining a user-specified workspace according to various embodiments.

FIG. 18 is a diagram illustrating an example operation of obtaining a user-specified workspace according to various embodiments.

According to various embodiments, referring to FIG. 18, if a user input for reducing a flexible display (e.g., the display module 160 in FIG. 1) in the extended state 1810 to a minimum size is received, an electronic device (e.g., the electronic device 100 in FIG. 1 or the processor 120 in FIG. 1) may store the workspace in the extended state 1810 as a user-specified workspace.

For example, if a user input of pressing a button 1811 long for reduction-sliding is received while the flexible display is in the extended state 1810, the electronic device may store the workspace in the extended state 1810 as a user-specified workspace and reduce the flexible display to the minimum state 1820. According to various embodiments, the electronic device may display a notification 1821 informing that the workspace in the extended state 1810 is stored as a user-specified workspace in a portion of the flexible display 1820 that is reduced to a minimum size.

In the case where a user input for permanently storing a currently used workspace as a user-specified workspace is configured as a user input other than the user input for reducing the flexible display to the minimum size, if the configured user input is received, the electronic device may permanently store a currently used workspace as a user-specified workspace.

Although only the case in which the flexible display is extended or reduced through a sliding operation has been illustrated and described in FIG. 18, according to various embodiments, in the case where the size of an active area of the display is changed through a folding operation as shown in FIGS. 5 and 6, if the active area is reduced to a minimum state, based on a user input in the state in which the active area is extended, as shown in FIG. 18, the workspace in the extended state may be stored as a user-specified workspace.

Figure 19:
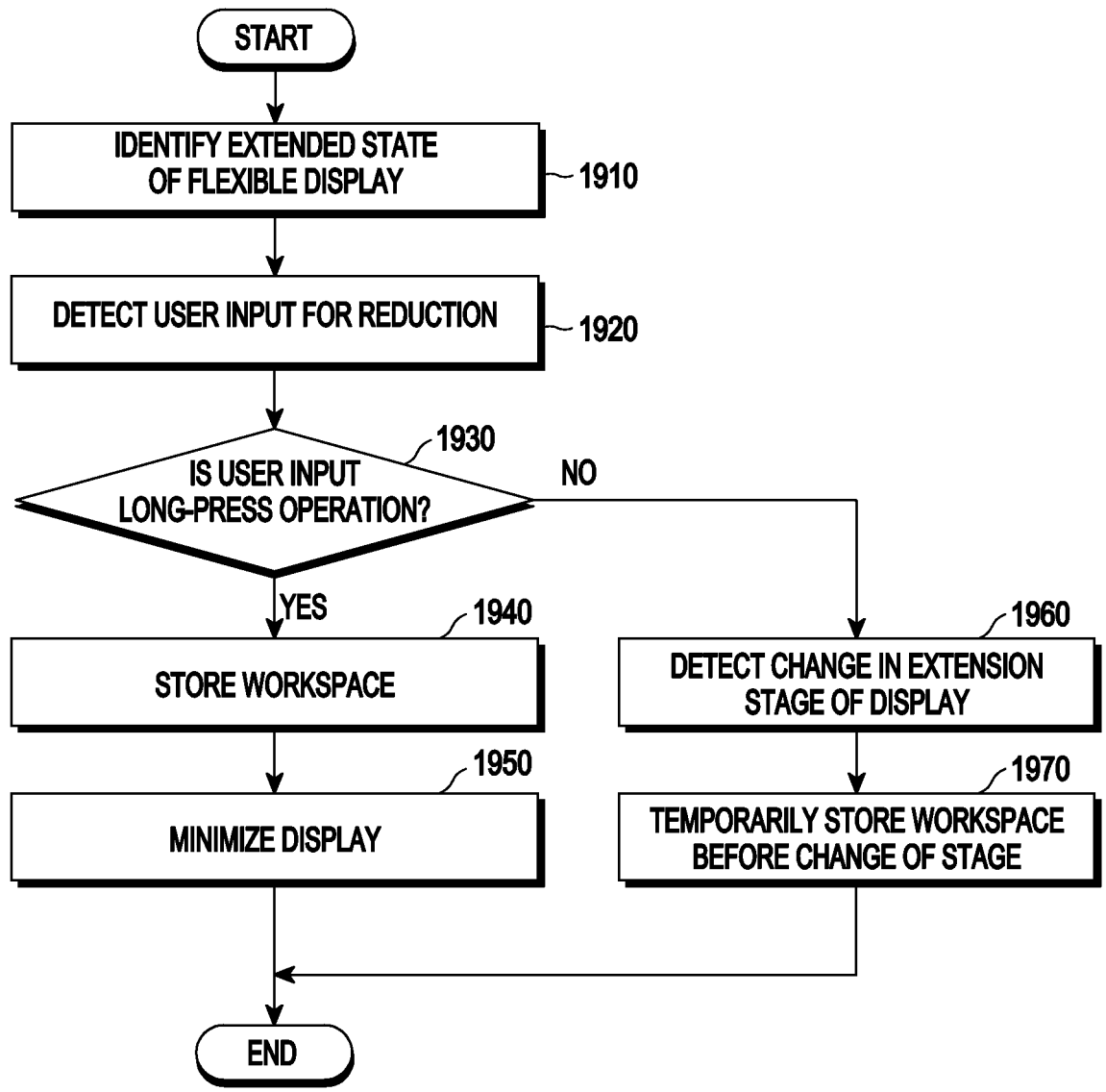
FIG. 19 is a flowchart illustrating an example operation of obtaining a user-specified workspace according to various embodiments.

FIG. 19 is a flowchart illustrating an example operation of obtaining a user-specified workspace according to various embodiments.

According to various embodiments, referring to FIG. 19, in operation 1910, an electronic device (e.g., the electronic device 100 in FIG. 1 or the processor 120 in FIG. 1) may identify the extended state of a flexible display (e.g., the display module 160 in FIG. 1).

According to various embodiments, in operation 1920, the electronic device may detect a user input for reduction. For example, the electronic device may detect a user input of pressing a button for reduction-sliding as a user input for reduction. According to various embodiments, if a drag input or a voice input for reduction-sliding is received, the electronic device may identify that a user input for reduction has been detected.

According to various embodiments, in operation 1930, the electronic device may identify whether the user input is a long-press operation on a button. For example, in the case where the operation for reducing the flexible display to a minimum size is configured as a long-press operation on a button, the electronic device may identify whether or not the user input is a long-press operation on the button, thereby determining whether or not the user input is an operation for reducing the flexible display to the minimum size. According to various embodiments, if the operation for reducing the flexible display to the minimum size is configured as another user input, the electronic device may identify whether the received user input is the configured user input.

According to various embodiments, if it is identified that the user input is a long-press operation (Yes in operation 1930), the electronic device may store a workspace in operation 1940. For example, the electronic device may store the workspace in the extended state of the flexible display before the user input is received. According to various embodiments, the electronic device may store, as a user-specified workspace, at least one of information about one or more applications that are running in the extended state of the flexible display, a layout in which execution screens of one or more applications are arranged, network setting information, volume setting information, or notification setting information.

According to various embodiments, in operation 1950, the electronic device may minimize the flexible display through reduction-sliding.

According to various embodiments, if it is identified that the user input is not a long-press operation (No in operation 1930), the electronic device may detect a change in the extension stage of the flexible display in operation 1960. For example, if reduction-sliding is terminated according to a user input during a reduction-sliding operation of the flexible display, the electronic device may detect the extension stage of the flexible display after sliding.

According to various embodiments, in operation 1970, the electronic device may temporarily store the workspace before the sliding operation. According to various embodiments, if the flexible display is restored to the extended state, the electronic device may provide the user with a workspace list including the temporarily stored workspace.

According to various example embodiments, an electronic device (e.g., the electronic device 100 in FIG. 1 or the electronic device 100 in FIG. 2) may include a housing (e.g., the structure 102 in FIG. 2), a flexible display (e.g., the display module 160 in FIG. 1) of which at least a portion is configured to be visible to the outside through the housing, and at least one processor (e.g., the processor 120 in FIG. 1) operably connected to the flexible display, wherein the at least one processor may be configured, based on a sliding operation being performed to make visible a second portion including at least a portion of a first portion of the flexible display to the outside, based on an input, in a state in which the first portion of the flexible display is visible to the outside, to: obtain context information in a state in which the second portion is visible, identify one or more workspaces based on the context information, control the display to display a list of the one or more workspaces in a portion of the second portion, and, based on one workspace being selected from the list, control the display to display execution screens of a plurality of applications in the second portion based on the selected workspace, and wherein each of the one or more workspaces may include size information of the second portion, information about a plurality of applications to be executed, and layout information of execution screens of the plurality of applications.

According to various example embodiments, the list may include one or more thumbnails corresponding to respective workspaces.

According to various example embodiments, each of the one or more thumbnails may include an image related to execution screens of a plurality of applications or an image related to icons of a plurality of applications.

According to various example embodiments, the context information may include at least one of size information of the second portion, time information during a sliding operation, place information during a sliding operation, or a recent frequency of use of an application.

According to various example embodiments, the context information may further include information about an application running during a sliding operation or an event occurring before receiving the input.

According to various example embodiments, some of the one or more workspaces may be specified, and the workspace specified may have priority over other workspaces.

According to various example embodiments, the electronic device may further include a memory (e.g., the memory 130 in FIG. 1), wherein the workspace specified may be a workspace in an extended state of the flexible display, which has been stored in the memory, based on receiving an input for reducing the flexible display in the extended state to a minimum size.

According to various example embodiments, the electronic device may further include a memory, wherein the at least one processor may be configured, based on an input for reducing the flexible display in an extended state being received, to store a workspace in the extended state in the memory and, based on the flexible display being reduced and then changed to the extended state, to control the display to display execution screens of a plurality of applications based on the workspace in the extended state, which is stored in the memory.

According to various example embodiments, the electronic device may further include a communication module (e.g., the communication module 190 in FIG. 1) comprising communication circuitry, wherein some of the one or more workspaces may include a workspace of an external electronic device, which is received from the external electronic device through the communication module.

According to various example embodiments, each of the one or more workspaces may further include at least one of a network setting, a volume setting, and a notification setting.

A method of controlling an electronic device according to various example embodiments may include, based on a sliding operation being performed to make visible a second portion including at least a portion of a first portion of a flexible display to the outside, based on an input, in a state in which the first portion of the flexible display is visible to the outside: obtaining context information in a state in which the second portion is visible, identifying one or more workspaces based on the context information, displaying a list of the one or more workspaces in a portion of the second portion, and based on one workspace being selected from the list, displaying execution screens of a plurality of applications in the second portion based on the selected workspace, and wherein each of the one or more workspaces may include size information of the second portion, information about a plurality of applications to be executed, and layout information of execution screens of the plurality of applications.

According to various example embodiments, the list may include one or more thumbnails corresponding to the respective workspaces.

According to various example embodiments, each of the one or more thumbnails may include an image related to execution screens of a plurality of applications or an image related to icons of a plurality of applications.

According to various example embodiments, the context information may include at least one of size information of the second portion, time information during a sliding operation, place information during a sliding operation, or a recent frequency of use of an application.

According to various example embodiments, the context information may further include information about an application that is running during a sliding operation or an event occurring before receiving the input.

According to various example embodiments, some of the one or more workspaces may be specified, and the workspace specified may have priority over other workspaces.

According to various example embodiments, the workspace specified may be a workspace in an extended state of the flexible display, which has been stored in the memory, based on receiving an input for reducing the flexible display in the extended state to a minimum size.

According to various example embodiments, the method may further include, based on an input for reducing the flexible display in an extended state being received: storing a workspace in the extended state in a memory, and based on the flexible display being reduced and then changed to the extended state, displaying execution screens of a plurality of applications based on the workspace in the extended state, which is stored in the memory.

According to various example embodiments, some of the one or more workspaces may include a workspace of an external electronic device, which is received from the external electronic device through a communication module.

According to various example embodiments, each of the one or more workspaces may further include at least one of a network setting, a volume setting, and a notification setting.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 100). For example, a processor (e.g., the processor 120) of the machine (e.g., the electronic device 100) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a housing including a first housing part and a second housing part, wherein the second housing part is configured to move with respect to the first housing part from a first state to a second state;
   a flexible display coupled to the first housing part and the second housing part such that a size of an area of the flexible display that is visible from a front side of the housing changes as the second housing part moves from the first state to the second state;
   a processor; and
   memory storing instructions that, when executed by the processor, cause the electronic device to:
   based on the housing being changed from the first state to the second state, identify a plurality of workspaces based on a size of a visible area of the flexible display in the second state, wherein each of the workspaces comprises size information of the visible area in the second state, information about a plurality of applications to be executed in the respective workspace, and layout information of a layout of execution screens of a plurality of applications in the respective workspace,
   control the display to display a list including a plurality of images, each of the images corresponding to a respective one of the workspaces, and wherein each of the images includes execution screens or icons of a plurality of applications to be displayed in the corresponding workspace, wherein the execution screens or the icons are arranged based on layout information of the corresponding workspace, and
   based on one image being selected from the list, control the display to display execution screens of a plurality of applications of the workspace corresponding to the selected one image, arranged in a layout of the workspace corresponding to the selected one image, in the visible area in the second state.

2. The electronic device of claim 1, wherein the list comprises one or more thumbnails corresponding to respective workspaces.

3. The electronic device of claim 1, wherein the instructions cause the electronic device to identify the plurality of workspaces further based on time information during a move operation of the second housing part, place information during the move operation, or a frequency of use of an application.

4. The electronic device of claim 3, wherein the instructions cause the electronic device to identify the plurality of workspaces further based on information about an application running during the move operation or an event occurring before receiving an input for the move operation.

5. The electronic device of claim 1, wherein some of the workspaces are specified, and
   wherein the specified workspaces have priority over other workspaces.

6. The electronic device of claim 5,
   wherein each specified workspace is a workspace for the second state which has been stored in the memory, based on receiving an input for changing the housing from the second state to the first state.

7. The electronic device of claim 1, wherein the instructions cause the electronic device to, based on receiving an input for moving the second housing part from the second state to the first state, store a workspace for the second state in the memory, and
   based on the second housing part moving to first state and then to the second state, control the display to display execution screens of a plurality of applications, based on the workspace for the second state, which is stored in the memory.

8. The electronic device of claim 1, further comprising a communication module comprising communication circuitry,
   wherein some of the workspaces respectively comprise a workspace of an external electronic device received from the external electronic device through the communication module.

9. The electronic device of claim 1, wherein each of the workspaces further comprises at least one of a network setting, a volume setting, or a notification setting.

10. A method of controlling an electronic device, the method comprising:
    based on a housing of the electronic device changing from a first state to a second state, identifying a plurality of workspaces based on a size of a visible area of a flexible display of the electronic device in the second state, wherein the housing includes a first housing part and a second housing part, and wherein each of the workspaces comprises size information of the visible area in the second state, information about a plurality of applications to be executed in the respective workspace, and layout information of a layout of execution screens of a plurality of applications in the respective workspace;
    displaying a list including a plurality of images, each of the images corresponding to a respective one of the workspaces, wherein each of the images includes execution screens or icons of a plurality of applications to be displayed in the corresponding workspace, and wherein the execution screens or the icons are arranged based on layout information of the corresponding workspace; and
    based on one image being selected from the list, displaying execution screens of a plurality of applications of the workspace corresponding to the selected one image, arranged in a layout of the workspace corresponding to the selected one image, in the visible area in the second state.

11. The method of claim 10, wherein the list comprises one or more thumbnails corresponding to respective workspaces.

12. The method of claim 10, wherein the identifying the one or more workspaces comprises identifying the plurality of workspaces further based on time information during a move operation of the second housing part, place information during the move operation, or a frequency of use of an application.

13. The method of claim 12, wherein the identifying the one or more workspaces comprises identifying the plurality of workspaces further based on information about an application running during the move operation or an event occurring before receiving an input for the move operation.

14. The method of claim 10, wherein some of the workspaces are specified, and wherein the specified workspaces have priority over other workspaces.

15. The method of claim 14, wherein each specified workspace is a workspace for the second state, which has been stored in memory of the electronic device, based on receiving an input for changing the housing from the second state to the first state.

16. The method of claim 10, further comprising:
based on an input for moving the housing from the second state to the first state, being received, storing a workspace for the second state in a memory of the electronic device; and
based on the housing moving to first state and then to the second state, displaying execution screens of a plurality of applications based on the workspace for the second state, which is stored in the memory.

17. The method of claim 10, wherein some of the workspaces respectively comprise a workspace of an external electronic device received from the external electronic device through a communication module.

18. One or more non-transitory computer-readable storage media storing computer-executable instructions that, when executed by a processor of an electronic device, cause the electronic device to perform operations, the operations comprising:

based on a housing of the electronic device changing from a first state to a second state, identifying a plurality of workspaces based on a size of a visible area of a flexible display of the electronic device in the second state, wherein the housing includes a first housing part and a second housing part, and wherein each of the workspaces comprises size information of the visible area in the second state, information about a plurality of applications to be executed in the respective workspace, and layout information of a layout of execution screens of a plurality of applications in the respective workspace;

displaying a list including a plurality of images, each of images corresponding to a respective one of the workspaces, wherein each of images includes execution screens or icons of a plurality of applications to be displayed in the corresponding workspace, and wherein the execution screens or the icons are arranged in a layout of the corresponding workspace; and based on one image being selected from the list, displaying execution screens of a plurality of applications of the workspace corresponding to the selected one image, arranged in a layout of the workspace corresponding to the selected one image, in the visible area in the second state.

* * * * *